(12) United States Patent
Rabenko et al.

(10) Patent No.: US 7,190,704 B2
(45) Date of Patent: Mar. 13, 2007

(54) CABLE MODEM SYSTEM WITH SAMPLE AND PACKET SYNCHRONIZATION

(75) Inventors: Theodore F. Rabenko, Duluth, GA (US); James C. H. Thi, Irvine, CA (US); John D. Horton, Jr., Alpharetta, GA (US); Thomas J. Quigley, Lawrenceville, GA (US); Lisa V. Denney, Suwanee, GA (US); Jonathan S. Min, Buena Park, CA (US); Christopher R. Jones, Newport Beach, CA (US); Henry Samueli, San Juan Capistrane, CA (US); Fang Lu, Irvine, CA (US); Feng Chen, Irvine, CA (US); Sean F. Nazareth, Anaheim Hills, CA (US)

(73) Assignee: Broadcom Corporation, Irvine, CA (US)

( * ) Notice: Subject to any disclaimer, the term of this patent is extended or adjusted under 35 U.S.C. 154(b) by 378 days.

(21) Appl. No.: 10/780,362

(22) Filed: Feb. 17, 2004

(65) Prior Publication Data

US 2004/0163120 A1     Aug. 19, 2004

Related U.S. Application Data

(63) Continuation of application No. 09/501,892, filed on Feb. 10, 2000, now Pat. No. 6,763,032.

(60) Provisional application No. 60/119,872, filed on Feb. 12, 1999, provisional application No. 60/136,684, filed on May 28, 1999.

(51) Int. Cl.
*H04J 3/06* (2006.01)

(52) U.S. Cl. .................... 370/508; 370/350; 375/229
(58) Field of Classification Search ............... 370/508, 370/350, 512, 521, 401; 375/350, 229
See application file for complete search history.

(56) References Cited

U.S. PATENT DOCUMENTS 5,452,289 A     9/1995   Sharma et al.

(Continued)

OTHER PUBLICATIONS

"Radio Frequency Interface Specification, SP-RFIv1.1-I03-991105" *Data-Over-Cable Service Interface Specifications*, 1999, Cable Television Laboratories, Inc.

*Primary Examiner*—Wellington Chin
*Assistant Examiner*—Binh Q. Nguyen
(74) *Attorney, Agent, or Firm*—Christie, Parker & Hale, LLP

(57) ABSTRACT

A method for communicating information is disclosed wherein a time slot is allocated in a time division multiple access system for a transmission from a subscriber to a headend. Synchronization of a clock of the subscriber with respect to a clock of the headend is enhanced using a message transmitted from the headend to the subscriber which is indicative of an error in a subscriber transmission time with respect to the time slot. A feedback loop process is used to determine at least one of fractional symbol timing correction and carrier phase correction of a transmission from the subscriber to the headend. Filter coefficients are generated at the headend from a ranging signal transmitted from the subscriber to the headend and transmitting the filter coefficients from the headend to the subscriber, the filter coefficients being used by the subscriber to compensate for noise in a transmission from the subscriber to the headend.

5 Claims, 24 Drawing Sheets

U.S. PATENT DOCUMENTS

| | | |
|---|---|---|
| 5,471,470 A | 11/1995 | Sharma et al. |
| 5,577,041 A | 11/1996 | Sharma et al. |
| 5,600,649 A | 2/1997 | Sharma et al. |
| 5,764,627 A | 6/1998 | Sharma et al. |
| 5,790,532 A | 8/1998 | Sharma et al. |
| 5,825,829 A | 10/1998 | Borazjani et al. |
| 5,881,363 A | 3/1999 | Ghosh et al. |
| 6,028,860 A * | 2/2000 | Laubach et al. ....... 370/395.64 |
| 6,044,089 A | 3/2000 | Ferriere |
| 6,047,023 A | 4/2000 | Arnstein |
| 6,122,338 A * | 9/2000 | Yamauchi ................... 375/377 |
| 6,230,203 B1 * | 5/2001 | Koperda et al. ............ 709/229 |
| 6,230,860 B1 * | 5/2001 | Wu ........................ 191/12.2 R |
| 6,249,526 B1 | 6/2001 | Loukianov |
| 6,272,150 B1 * | 8/2001 | Hrastar et al. .............. 370/486 |
| 6,285,681 B1 | 9/2001 | Kolze et al. |
| 6,292,651 B1 | 9/2001 | Dapper et al. |
| 6,577,642 B1 * | 6/2003 | Fijolek et al. .............. 370/465 |
| 6,584,147 B1 | 6/2003 | Schaumont et al. |
| 6,611,537 B1 * | 8/2003 | Edens et al. ................. 370/503 |
| 2001/0048679 A1 * | 12/2001 | Czerwiec et al. ........... 370/352 |
| 2001/0055319 A1 | 12/2001 | Quigley et al. |
| 2003/0086515 A1 * | 5/2003 | Trans et al. ................. 375/346 |

\* cited by examiner

FIG.13

| UPDATE RATE | COARSE COEFFS | FINE COEFFICIENTS |
|---|---|---|
| 1kHz(1ms) | $K0=2^{-11}$<br>$K1=2^{-15}$<br>(BW=50Hz) | $K0=2^{-16}$<br>$K1=2^{-25}$<br>(BW=1Hz) |
| 300Hz(3.3ms) | $K0=2^{-12}$<br>$K1=2^{-15}$<br>(BW=20Hz) | $K0=2^{-16}$<br>$K1=2^{-23}$<br>(BW=1Hz) |
| 100Hz(10ms) | $K0=2^{-13}$<br>$K1=2^{-16}$<br>(BW=10Hz) | $K0=2^{-16}$<br>$K1=2^{-22}$<br>(BW=1Hz) |
| 50Hz(20ms) | $K0=2^{-14}$<br>$K1=2^{-17}$<br>(BW=5Hz) | $K0=2^{-16}$<br>$K1=2^{-21}$<br>(BW=1Hz) |
| 30Hz(33ms) | $K0=2^{-15}$<br>$K1=2^{-18}$<br>(BW=3Hz) | $K0=2^{-17}$<br>$K1=2^{-21}$<br>(BW=1Hz) |
| 10Hz(100ms) | $K0=2^{-17}$<br>$K1=2^{-20}$<br>(BW=1Hz) | $K0=2^{-17}$<br>$K1=2^{-20}$<br>(BW=1Hz) |
| 5Hz(200ms) | $K0=2^{-18}$<br>$K1=2^{-20}$<br>(BW=1Hz) | $K0=2^{-18}$<br>$K1=2^{-20}$<br>(BW=1Hz) |

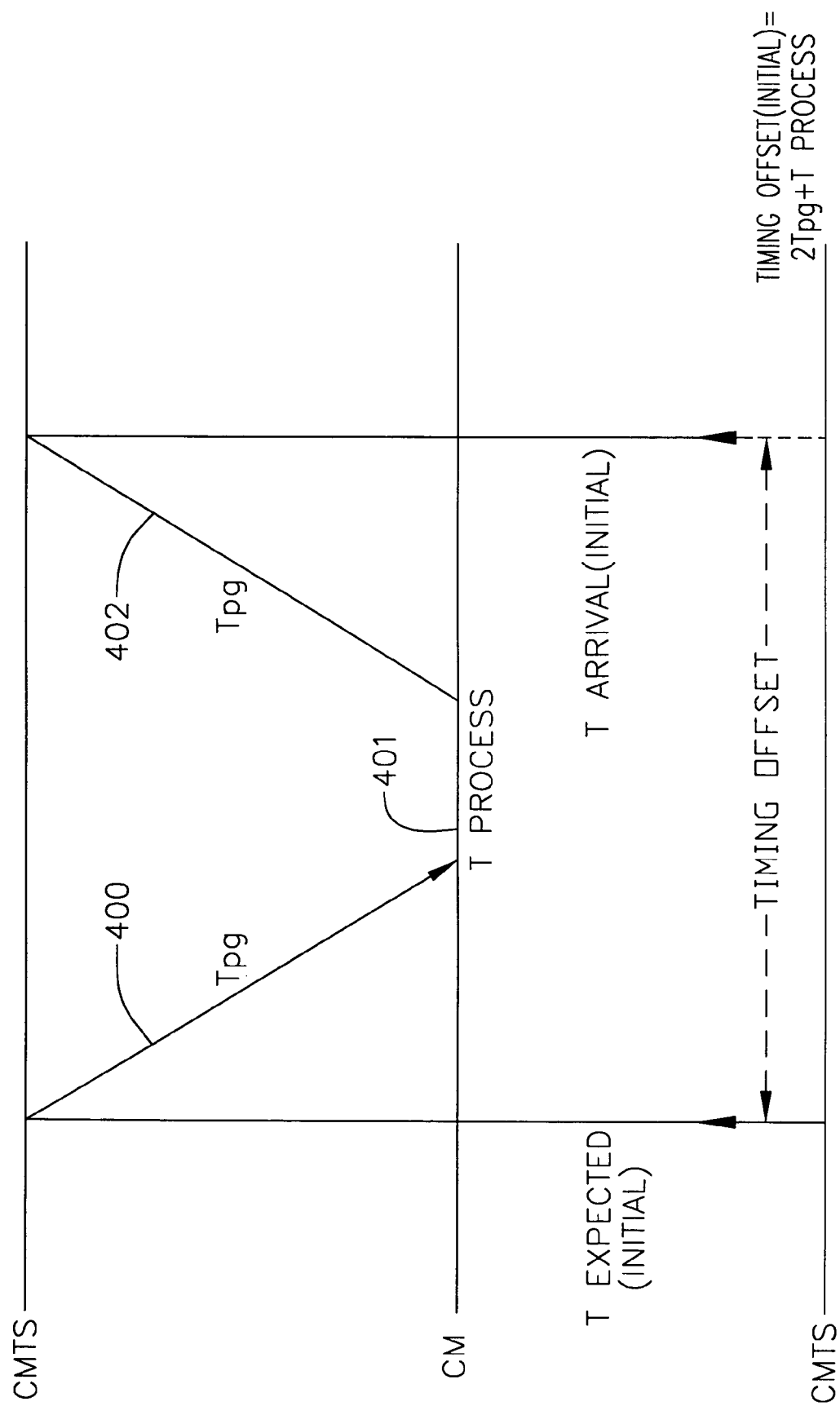

SAMPLE CLOCK (4.096 MHZ)

GRANT_R_CV[4] (GRANT PRESENT)

GRANT_R_CV[3:0] SID (CHANNEL NUMBER)

DERIVED SAMPLE CLOCK (8 KHZ)

GRANT_REC[4] (GRANT PRESENT)

SAMPLE

CABLE MODEM SYSTEM WITH SAMPLE AND PACKET SYNCHRONIZATION

CROSS-REFERENCE TO RELATED APPLICATIONS

This patent application is a continuation of U.S. patent application Ser. No. 09/501,892 filed Feb. 10, 2000, now U.S. Pat. No. 6,763,032 issued on Jul. 13, 2004, which claims the benefit of the filing date of U.S. Provisional Patent Application No. 60/119,872 filed Feb. 12, 1999; and U.S. Provisional Patent Application No. 60/136,684 filed May 28, 1999; the entire contents of both of which are hereby expressly incorporated by reference.

FIELD OF THE INVENTION

The present invention relates generally to communication systems. The present invention relates more particularly to bit-rate sampled data transmission, such as telephone, fax or modem communication utilizing a cable modem/cable modem termination system.

BACKGROUND OF THE INVENTION

A desired solution for high speed data communications appears to be cable modem. Cable modems are capable of providing data rates as high as 56 Mbps, and is thus suitable for high speed file transfer, including applications such as bit-rate sampled data transmission to and from telephones, faxes or modem devices.

However, when transmitting packet based voice using cable modems, there is a need to synchronize voice packet sampling with cable modem system grant processing. The present invention provides a solution for such need.

SUMMARY OF THE INVENTION

In accordance with the present invention a method of processing sampled voice packets from a voice packet sender for transmission over a bit-rate sampled data transmission system, such as by a cable modem over a cable modem termination system, to a voice packet recipient is provided. Unsolicited grant arrivals in response to a request from the voice packet sender coupled to the cable modem are determined. The storing of sampled voice packets is synchronized with the unsolicited grant arrivals. Upon receipt of an unsolicited grant arrival, currently stored sampled voice packets are transmitted to the cable modem for further transmission to the voice packet recipient over the cable modem termination system. The synchronization includes determining time needed between adjacent unsolicited grant arrivals for storing the sampled voice packets and for processing stored sampled voice packets, sampling voice packets by clocking voice packet sampling using a clock derived from a cable modem clock, and scheduling processing of the stored sample voice packets to be ready for transmission at a next unsolicited grant arrival. The time needed determination involves counting time between unsolicited grant arrivals and upon reaching a count indicative of the interval between unsolicited grant arrivals, providing for transmission of the currently stored sampled voice packets at the next unsolicited grant arrival.

Further, the voice packet recipient can be a Public Switched Telephone Network (PSTN) gateway a clock of a cable modem termination system is synchronized with a clock of the PSTN. Also, the processing of the sampled voice packets can be for voice compression.

In addition, the voice packet sender can include a plurality of voice packet senders, each voice packet sender having a channel identifier. A multiplexing transmission is provided based upon the channel identifier such that upon receipt of an unsolicited grant arrival associated with the channel identifier currently stored sampled voice packets of the voice packet sender identified by the channel identifier are transmitted to the cable modem for further transmission over the cable modem termination system to the voice packet recipient of the voice packet sender having the channel identifier.

In accordance with an embodiment of the present invention a method for communicating information is provided. A time slot is allocated in a time division multiple access system for a transmission from a subscriber to a headend, the time slot being sufficient for only a first portion of a transmission, a second portion of the transmission being transmitted in other than the first time slot. Synchronization of a clock of the subscriber with respect to a clock of the headend is enhanced using a message transmitted from the headend to the subscriber which is indicative of an error in a subscriber transmission time with respect to the time slot. A feedback loop process is used to determine at least one of fractional symbol timing correction and carrier phase correction of a transmission from the subscriber to the headend. The quality of at least one channel is monitored and modulation is changed in response changes to monitored channel quality. Information representative of parameters of received time division multiple access data is used to facilitate processing of the received time division multiple access data in a receiver, the parameters being communicated within the headend. Filter coefficients are generated at the headend from a ranging signal transmitted from the subscriber to the headend and transmitting the filter coefficients from the headend to the subscriber, the filter coefficients being used of the subscriber to compensate for noise in a transmission from the subscriber to the headend. Sampled packets from a packet sender are processed for transmission over a transmission system having a periodically allocated bandwidth to a packet recipient by: determining unsolicited grant arrivals in response to a request from the packet sender;
synchronizing the storing of sampled packets with the unsolicited grant arrivals; and transmitting, upon receipt of an unsolicited grant arrival, currently stored sampled packets for further transmission to the packet recipient over the transmission system having a periodically allocated bandwidth.

DESCRIPTION OF THE DRAWINGS

These and other features, aspects and advantages of the present invention will be more fully understood when considered with respect to the following detailed description, appended claims and accompanying drawings wherein:

FIG. 13 shows in table form an example of coarse and fine coefficients suitable for various different update rates and bandwidths.

FIG. 14 shows in graphical form a timing slot offset between the cable modem clock and the cable modem termination system clock.

DETAILED DESCRIPTION OF THE INVENTION

A description of the cable modem and cable modem termination system aspects in accordance with the present invention is first provided. A description of the voice sample and packet synchronization aspects in accordance with the present invention is then provided.

Cable Modems and the Cable Modem Termination System

In a cable modem system, a headend or cable modem termination system (CMTS) is located at cable company facility and functions as a modem which services a large number subscribers. Each subscriber has a cable modem (CM). Thus, the CMTS facilitates bidirectional communication with any desired one of the plurality of CMs.

The CMTS communicates with the plurality of CMs via a hybrid fiber coaxial (HFC) network, wherein optical fiber provides communication to a plurality of fiber nodes and each fiber node typically serves approximately 500 to 2,000 subscribers, which communicate with the node via coaxial cable. The hybrid fiber coaxial network of a CM system utilizes a point-to-multipoint topology to facilitate communication between the CMTS and the plurality of CMs. Frequency domain multiple access (FDMA)/time division multiplexing (TDM) is used to facilitate communication from the CMTS to each of the CMs, i.e., in the downstream direction. FDMA/time domain multiple access (TDMA) is used to facilitate communication from each CM to the CMTS, i.e., in the upstream direction.

The CMTS includes a downstream modulator for facilitating the transmission of data communications therefrom to the CMs and an upstream demodulator for facilitating the reception of data communications from the CMs. The downstream modulator of the CMTS utilizes either 64 QAM or 256 QAM in a frequency band of 54 MHz to 860 MHz to provide a data rate of up to 56 Mbps.

Similarly, each CM includes an upstream modulator for facilitating the transmission of data to the CMTS and a downstream demodulator for receiving data from the CMTS. The upstream modulator of each CM uses either QPSK or 16 QAM within the 5 MHz to 42 MHz bandwidth of the upstream demodulator and the downstream demodulator of each CM utilizes either 64 QAM or 256 QAM in the 54 MHz to 860 MHz bandwidth of the downstream modulator (in North America).

Figure 1:
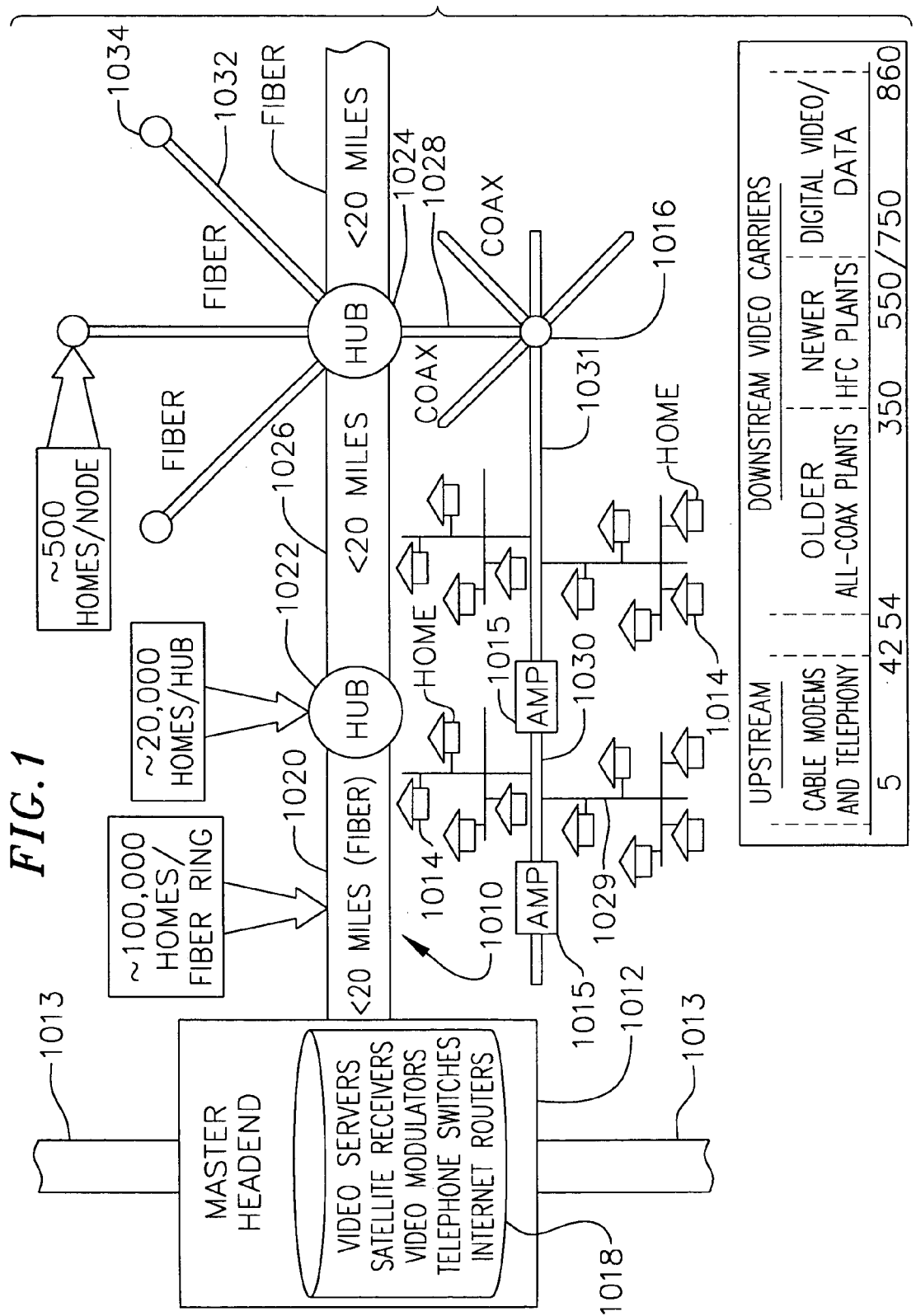
FIG. 1 shows in simplified block diagram form an environment within which the present invention operates.

Referring now to FIG. 1, a hybrid fiber coaxial (HFC) network 1010 facilitates the transmission of data between a headend 1012, which includes at least one CMTS, and a plurality of homes 1014, each of which contains a CM. Such HFC networks are commonly utilized by cable providers to provide Internet access, cable television, pay-per-view and the like to subscribers.

Approximately 500 homes 1014 are in electrical communication with each node 1016, 1034 of the HFC network 1010, typically via coaxial cable 1029, 1030, 1031. Amplifiers 1015 facilitate the electrical connection of the more distant homes 1014 to the nodes 1016, 1034 by boosting the electrical signals so as to desirably enhance the signal-to-noise ratio of such communications and by then transmitting the electrical signals over coaxial conductors 1030, 1031. Coaxial conductors 1029 electrically interconnect the homes 1014 with the coaxial conductors 1030, 1031, which extend between amplifiers 1015 and nodes 1016, 1034.

Each node 1016, 1034 is electrically connected to a hub 1022, 1024, typically via an optical fiber 1028, 1032. The hubs 1022, 1024 are in communication with the headend 1012, via optical fiber 1020, 1026. Each hub is typically capable of facilitating communication with approximately 20,000 homes 1014.

The optical fiber 1020, 1026 extending intermediate the headend 1012 and each hub 1022, 1024 defines a fiber ring which is typically capable of facilitating communication between approximately 100,000 homes 1014 and the headend 1012.

The headend 1012 may include video servers, satellite receivers, video modulators, telephone switches and/or Internet routers 1018, as well as the CMTS. The headend 1012 communicates via transmission line 1013, which may be a T1 or T2 line, with the Internet, other headends and/or any other desired device(s) or network.

Figure 2:
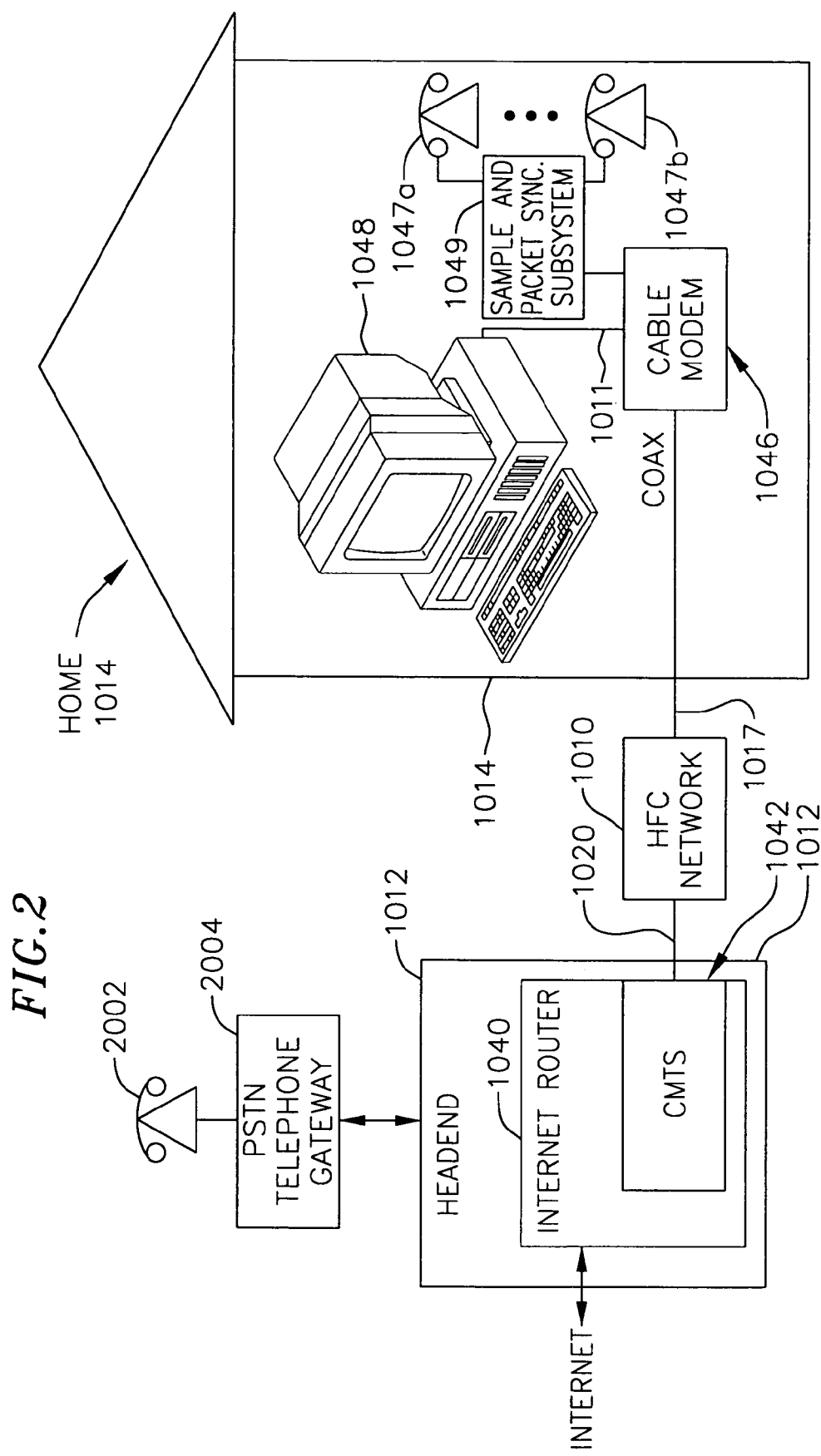
FIG. 2 shows in simplified block diagram form the interconnection of an exemplary home utilizing the present invention in accordance with a cable modem and cable modem termination system.

Referring now to FIG. 2, a simplified block diagram shows the interconnection of the headend 1012 and an exemplary home 1014, wherein a CM 1046 communicates with a CMTS 1042, via HFC network 1010. Personal computer 1048, disposed within the home 1014, is connected via cable 1011 to the CM 1046. More particularly, with respect to the present invention, bit-rate sampled data transmission devices 1047*a* and 1047*b*, such as telephones, fax or modem units, are connected to sample and packet synchronization subsystem (described in more detail below) which, in turn, interfaces to CM 1046. CM 1046 communicates via coaxial cable 1017 with the HFC network 1044, which, in turn, communicates via optical fiber 1020 with CMTS 1042 of the headend 1012. Internet router 1040 facilitates communication between the headend 1012 and the Internet or any other desired device or network, and in particular with respect to the present invention, to any end user system to which a call is being placed from home 1014, such as to a call recipient 2002 connected to the Public Switched Telephone Network (PSTN)through PSTN gateway 2004.

In order to accomplish TDMA for upstream communication, it is necessary to assign time slots within which CMs having a message to send to the CMTS are allowed to transmit. The assignment of such time slots is accomplished by providing a request contention area in the upstream data path within which the CMs are permitted to contend in order to place a message which requests additional time in the upstream data path for the transmission of their message. The CMTS responds to these requests by assigning time slots to the CMs making such a request, so that as many of the CMs as possible may transmit their messages to the CMTS utilizing TDMA and so that the transmissions are performed without undesirable collisions. In other words, the CM requests an amount of bandwidth on the cable system to transmit data. In turn, the CM receives a "grant" of an amount of bandwidth to transmit data in response to the request. This time slot assignment by the CMTS is known as a "grant" because the CMTS is granting a particular CM permission to use a specific period of time in the upstream.

Because of the use of TDMA, the CMTS uses a burst receiver, rather than a continuous receiver, to receive data packets from CMs via upstream communications. As those skilled in the art will appreciate, a continuous receiver can only be utilized where generally continuous communications (as opposed to burst communications as in the present invention) are performed, so as to substantially maintain timing synchronization between the transmitter and the receiver, as is necessary for proper reception of the communicated information. During-continuous communications, timing recovery is a more straightforward process since signal acquisition generally only occurs at the initiation of such communications. Thus, acquisition is generally only performed in continuous receivers once per continuous transmission and each continuous transmission may be very long.

However, the burst communications inherent to TDMA systems require periodic and frequent reacquisition of the signal. That is, during TDMA communications, the signal must be reacquired for each separate burst transmission being received.

The assignment of such time slots is accomplished by providing a request contention area in the upstream data path within which the CMs are permitted to contend in order to place a message which requests time in the upstream data path for the transmission of their message. The CMTS responds to these requests by assigning time slots to the Cms making such a request, so that as many of the CMs as possible may transmit their messages to the CMTS utilizing TDMA and so that the transmissions are performed without undesirable collisions.

Briefly, upstream data transmission on an upstream channel is initiated by a request made by a CM for a quantity of bandwidth, i.e., a plurality of time slots, to transmit data comprising a message. The size of the request includes payload, i.e., the data being transmitted, and overhead, such as preamble, FEC bits, guard band, etc. After the request is received at the headend, the CMTS grants bandwidth to the requesting CM and transmits the size of the grant and the specific time slots to which the data is assigned for insertion to the requesting CM.

It is important to understand that a plurality of such CMs are present in a CM system and that each of the CMs may, periodically, transmit a request for a time slot allocation to the CMTS. Thus, the CMTS frequently receives such requests and allocates time slots in response to such requests. Information representative of the allocated time slots is compiled to define a MAP and the MAP is then broadcast to all of the CMs on a particular channel, so as to provide information to all of the CMs which have one or more data packets to transmit to the CMTS precisely when each of the CMs is authorized to transmit its data packets).

Figure 3:
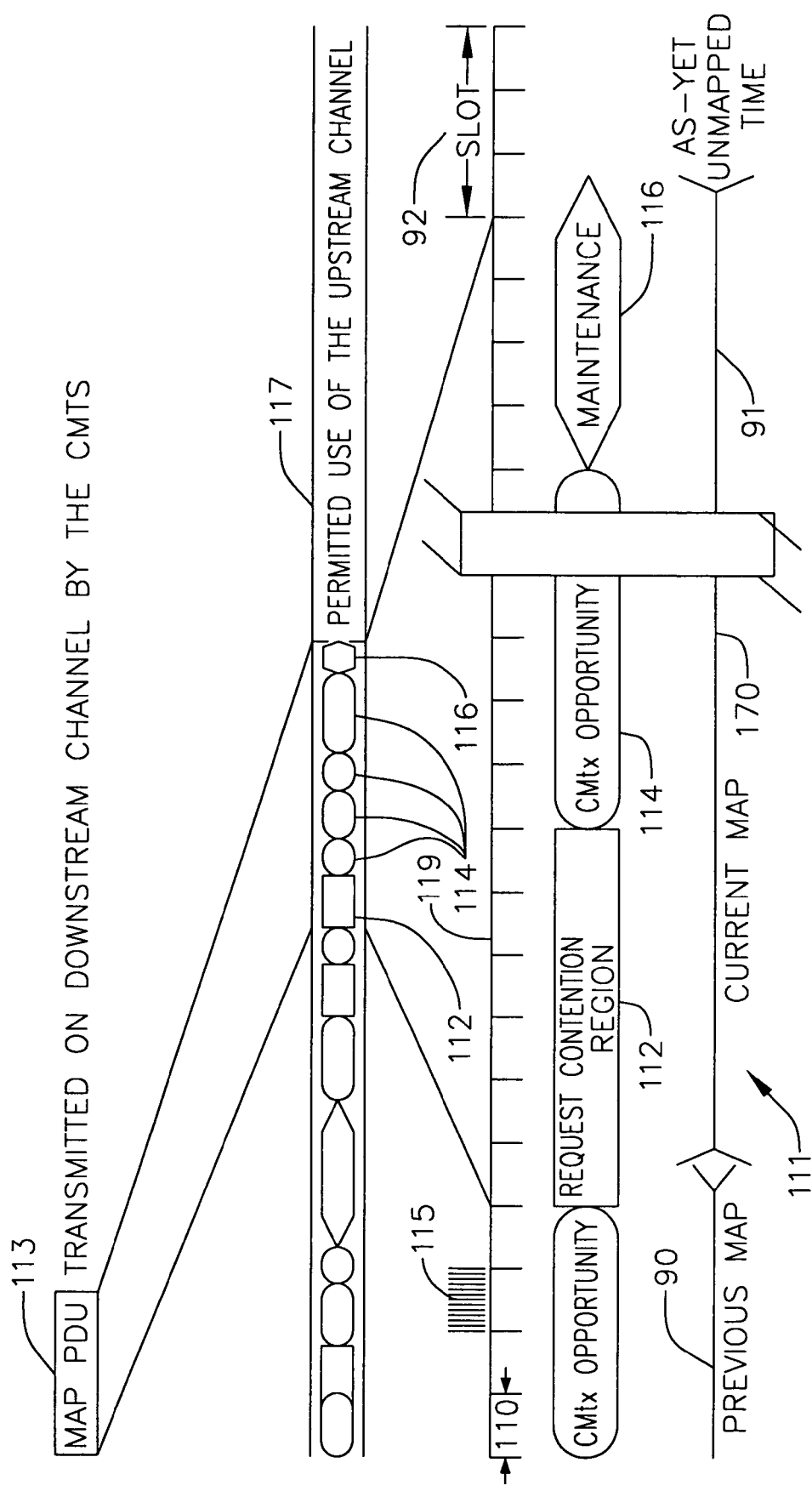
FIG. 3 shows in graphical form the allocation of time slots by the cable modem termination system.

Referring now to FIG. 3, the allocation of time slots by the CMTS and the generation of a MAP which defines the time slot allocations is described in more detail. The contents of a MAP protocol data unit (PDU) 113 are shown. The MAP PDU 113, which is transmitted on the downstream channel by the CMTS 1042 to all of the CMs 1046 on a given frequency channel, contains the time slot allocations for at least some of the CMs 1046 which have previously sent a request to transmit one or more data packets to the CMTS 1042. When the channel bandwidth is sufficient, in light of the number of such requests received by the CMTS 1042, then the CMTS 1042 allocates a time slot for each such requesting CM 1046.

Further, the MAP PDU 113 at least occasionally defines at least one request contention region 112 and generally also contains a plurality of CM transmit opportunities 114 within the upstream channel 117. A maintenance frame 116 may also be defined by the MAP PDU 113 within the upstream channel 117, as discussed in detail below.

The request contention region 112 includes at least one time area within which the CMs 1046 transmit their requests to transmit data packets to the CMTS 1042. Each of the CM transmit opportunities 114 define a time slot within which a designated CM 1046 is permitted to transmit the data packet for which the request was previously sent to the CMTS 1042.

Additionally, one or more optional transmit contention regions (not shown) may be provided wherein CMs 1046 may contend for the opportunity to transmit data therein. Such transmit contention regions are provided when sufficient bandwidth is left over after the MAP PDU 113 has allocated transmit opportunities 114 to all of those CMs 1046 which have requested a time slot allocation. Thus, transmit contention regions are generally provided when upstream data flow is comparatively light.

The upstream channel 119, is divided into a plurality of time intervals 110, each of which may optionally be further subdivided into a plurality of sub-intervals 115. The upstream channel 119 thus partitioned so as to facilitate the definition of time slots, such that each of a plurality of CMs 1046 may transmit data packets to the CMTS 1042 without interfering with one another, e.g., without having data collisions due to data packets being transmitted at the same time.

Thus, the use of a MAP 113 facilitates the definition of slots 92. Each slot 92 may be used for any desired predetermined purpose, e.g., as a request contention region 112 or a transmit opportunity 114. Each slot 92, as defined by a MAP PDU 113, includes a plurality of time intervals 110 and may additionally comprise one or more sub-intervals 115 in addition to the interval(s) 110. The number of intervals 110 and sub-intervals 115 contained within a slot 92 depends upon the contents of the MAP PDU 113 which defines the slot 92. The duration of each interval 110 and sub-interval 115 may be defined as desired. Optionally, each sub-interval 115 is approximately equal to a media access control (MAC) timing interval. Each MAP PDU 113 defines a frame and each frame defines a plurality of slots 92.

The beginning of each sub-interval 115 is aligned in time with the beginning of each interval 110 and each interval 110 typically contains an integral number of sub-intervals 115.

Typically, the request contention region 112 and each CM transmit opportunity 114 includes a plurality of integral time intervals 110. However, the request contention region 112 and/or the CM transmit opportunity 114 may alternatively include any desired combination of intervals 110 and sub-intervals 115. Thus, each request contention region 112 may be utilized by a plurality of the CMs 1046 to request one or more time slot allocations which facilitate the transmission of one or more data packets during the CMs 1046 subsequently allocated transmit opportunity 114.

Each data packet may contain only data, although an extended data packet may be defined to include both data and a preamble. The preamble is typically stripped from an extended packet by the CMTS 1042 and the data in the packet is then processed by a central processing unit of the CMTS 1042.

The duration of the request contention region 112 is typically variable, such that it may be sized to accommodate the number of CMs 1046 expected to request time slot allocations from the CMTS 1042. The duration of the request contention region 112 may thus be determined by the number of requests transmitted by CMs as based upon prior experience.

The time slot allocations 92 defined by CM transmit opportunities 114 may optionally be defined, at least in part, on the basis of priorities established by the CMTS 1042 for different CMs 1046. For example, priorities may be established for individual CMs 1046 on the basis of an election made by the subscribers, which is typically dependent upon the type of service desired. Thus, a subscriber may elect to have either a premium (high priority) service or a regular (low priority) service.

Alternatively, priorities may be established by the CMTS 1042 for the CMs based upon size and number of CM transmit opportunities 114 historically requested by the subscribers. Thus, a CM that typically requires a large number of time intervals 110 may be defined as a high priority user, and thus given priority in the allocation of time slots within a CM transmit opportunity 114, based upon the assumption that such large usage is indicative of a continuing need for such priority, e.g., is indicative that the subscriber is utilizing cable television, pay-per-view or the like.

Alternatively, the CMTS may assign such priorities based upon the type of service being provided to each CM. Thus, for example, when cable television or pay-per-view is being provided to a CM, then the priority of that CM may be increased, so as to assure uninterrupted viewing.

The priority associated with each CM 1046 may determine both the size of time slots allocated thereto and the order in which such allocations are performed. Those allocations performed earlier in the allocation process are more likely to be completely filled than those allocations performed later in the allocation process. Indeed, allocations performed later in the allocation process may go unfilled, when the bandwidth of the channel is not sufficient to facilitate allocation of time slots for all requesting CMs 1046.

Time slots which define the maintenance region 116 are optionally provided in a MAP 113. Such maintenance regions 116 may be utilized, for example, to facilitate the synchronization of the clocks of the CMs with the clock of the CMTS. Such synchronization is necessary in order to assure that each CM 1046 transmits only within its allocated time slots, as defined by each CM's transmit opportunity 114.

The request contention region 112 CM transmit opportunity 114 and maintenance region 116 typically begin at the beginning of an interval 110 and end at the end of an interval 110. However, each request contention region 112, CM transmit opportunity 114 and maintenance region 116, may begin and end anywhere as desired. Thus, variable duration request contention regions 112, CM transmit opportunities 114 and maintenance regions 116 are provided. Such variable duration request contention regions 112, transmit opportunities 114 and maintenance regions 116 facilitate flexible operation of the CM system and enhance the efficiency of data communications on the CM system by tending to mitigate wasted channel capacity.

The current MAP 170 is transmitted in the downstream channel 111 after transmission of a previous MAP 90 and before any subsequent MAPs 91. Data, such as data packets associated with web pages, e-mail, cable television, pay-per-view television, digital telephony, etc. are transmitted between adjacent MAPs 90, 170, 91.

The contents of each CM transmit opportunity 114 optionally include data and a preamble. The data includes at least a portion of the data packet for which a request to transmit was sent to the CMTS 1042. The preamble typically contains information representative of the identification of the CM 1046 from which the data was transmitted, as well as any other desired information.

The data and the preamble do not have to occupy the full time interval of the cable transmit opportunity 114. Guard bands are optionally provided at the beginning and end of each slot, so as to decrease the precision with which time synchronization between the CMTS and each CM must be performed. Thus, by providing such guard bands, some leeway is provided in the transmit time during which each CM inserts its data packet into the upstream channel 119.

Figure 4:
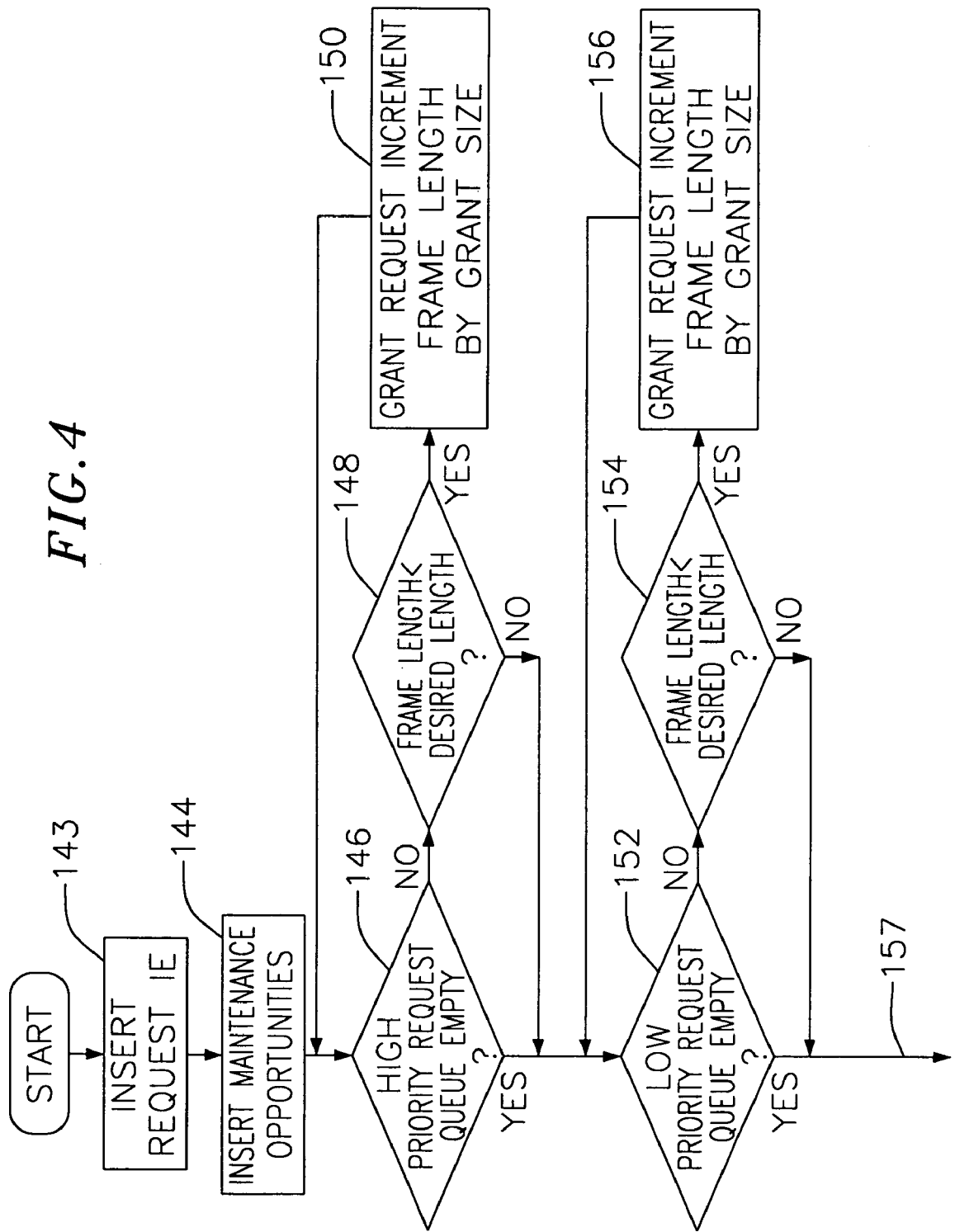
FIGS. 4 and 5 shows in flow diagram form the construction of a frame.
Figure 5:
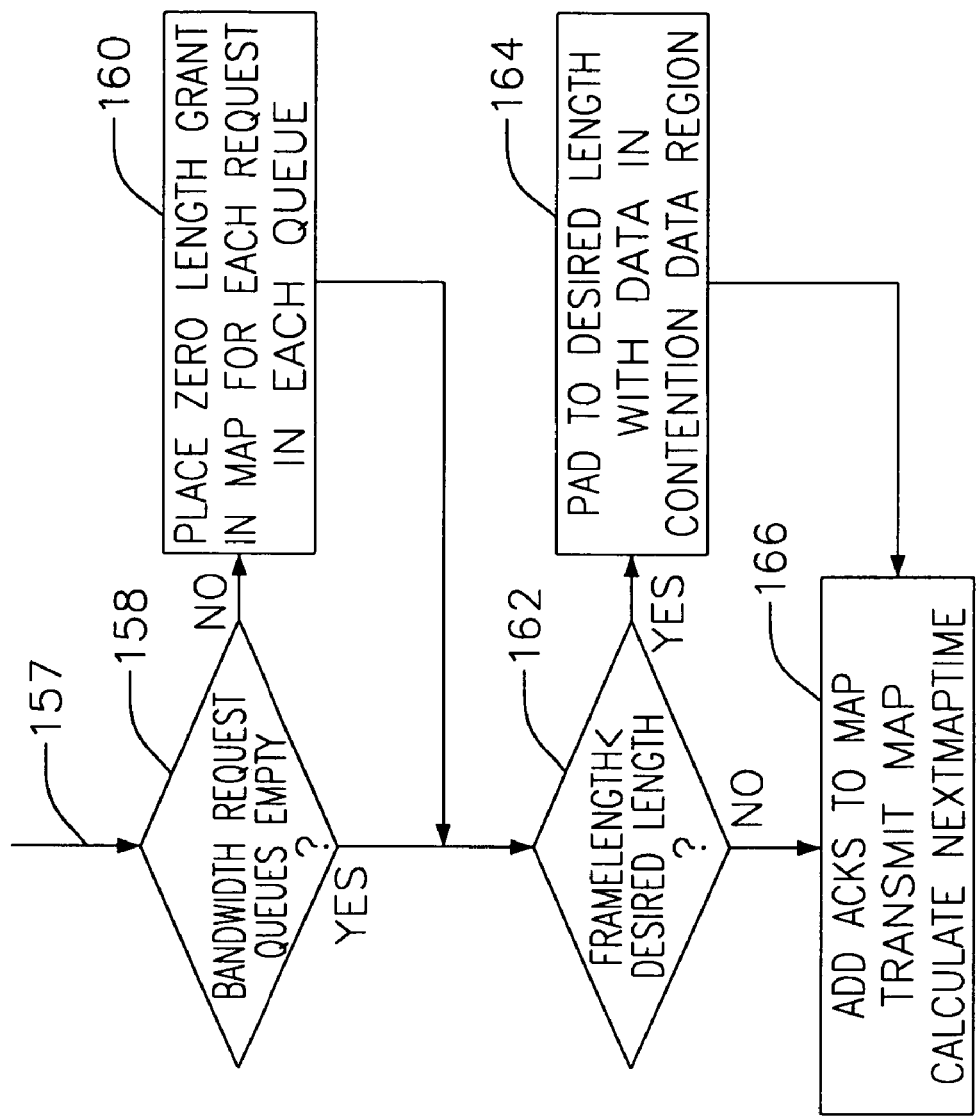

Referring now to FIGS. 4 and 5, the construction of a frame is shown. As shown in block 143, requests are made by the CMs 1046 in a request contention region 112 of a first MAP for the grant or allocation by the CMTS 1042 to the subscribers of Information Elements (IE). An Information Element may be considered to be the same as a region. A maintenance opportunity is optionally provided as shown at block 144. Such maintenance opportunities may, for example, be used to synchronize the operation of the CM 1046 with the operation of the CMTS 1042. As previously indicated, this maintenance opportunity may be provided only periodically.

A determination is then made at block 146 as to whether the high priority request queue is empty. If the answer is "No" with respect to the high priority request queue, a determination is then made at block 148 as to whether the frame length is less than a desired length. If the answer is "Yes", the request of the subscriber to transmit data is granted and the frame length is incremented by the size of the data requested at block 150.

If the high priority request queue is empty, a determination is made at block 152 as to whether the low priority request queue is empty. If the answer is "No", a determination is made at block 154 as to whether the frame length will be less than the desired length. If the answer is "Yes" with respect to the low priority request queue, the request of the CM 1046 to transmit data to the CMTS 1042 is granted and the frame length is incremented by the size of the grant. This is indicated at block 156.

It may sometimes happen that the frame length will be at least equal to the desired length when the request with respect to the high priority request queue is introduced to the block 148. Under such circumstances, the request is not granted and a determination is then made as to whether the low priority request queue is empty. Similarly, if the frame length will be greater than the desired frame length when a request with respect to the low priority request queue is made, the request is not granted. An indication is accordingly provided on a line 157 when the high priority request queue and the low priority request queue are both empty or when the frame length will be at least as great as the desired length.

When the high priority request queue and the low priority request queue are both empty or when the frame length will be at least as great as the desired length upon the assumed grant of a request, a determination is made, as at block 158 (FIG. 7) as to whether the request queues are empty. This constitutes an additional check to make sure that the queues are empty. If the answer to such determination is "No", this indicates that the frame length will be greater than the desired frame length upon the assumed grant of a request. Under such circumstances, a grant of a zero length is provided in the MAP 170 for each request in each queue. This zero length grant is provided so that the headend can notify the subscriber that the request has not been granted but was received by the headend. In effect, a zero length grant constitutes a deferral. The request was seen, i.e., not collided, but not granted yet. It will be granted in a subsequent MAP 91.

If a determination is made as at block 158 that the request queues are empty, a determination is then made at block 162 as to whether the frame length will be less than the desired frame length. If the answer is "Yes", the frame is padded to the desired length with data from a contention data region 168 in the frame, as indicated at block 164. The contention data region 168 constitutes an area of reduced priority in the frame. It provides for the transmission of data from the CMs 1046 to the CMTS 1042 via available slots in the frame where CMs have not been previously assigned slots by the CMTS 1042. The contention data region does not require a grant by the CMTS 1042 of a request from a CM 1046 as in the request contention data region 112 in FIG. 3. Since no grant from the CMTS 1042 is required, the contention data region 168 in FIG. 7 (described below in additional detail) provides faster access to data for the subscriber than the request contention region 112.

Available slots in a frame are those that have not been assigned on the basis of requests from the CMs 1046. As indicated at block 166 in FIG. 5, the CMTS 1042 acknowledges to the CM 1046 that the CMTS 1042 has received data from the contention data region in the frame. The CMTS 1042 provides this acknowledgment because the CM 1046 would not otherwise know that such data was not involved in a data collision and has, indeed, has been received from the contention data region 168.

Figure 6:
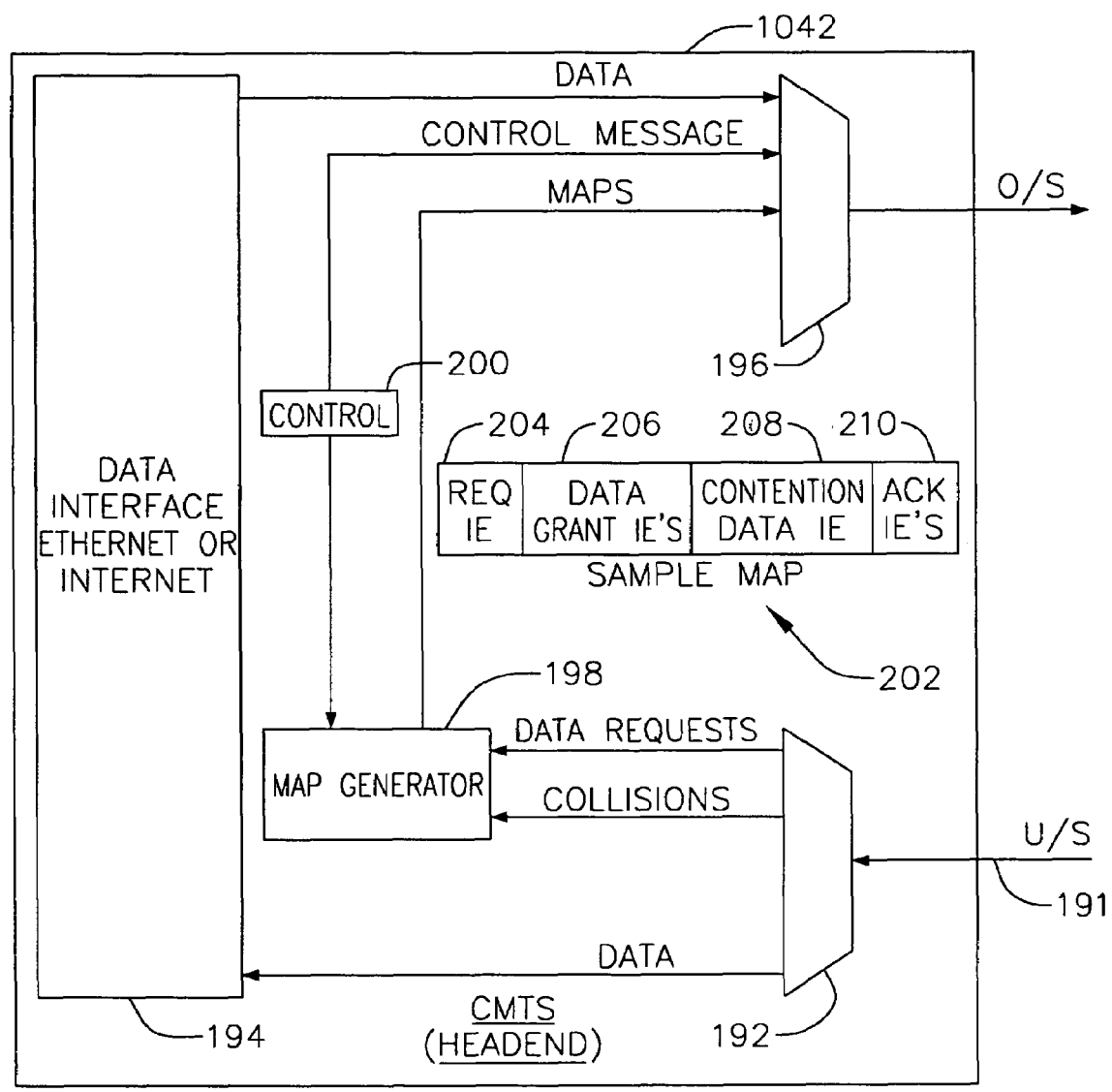
FIGS. 6 and 7 show in simplified block diagram form a portion of the cable modem termination system which receives requests from the cable modems and which generates MAPS in response to the requests.
Figure 7:
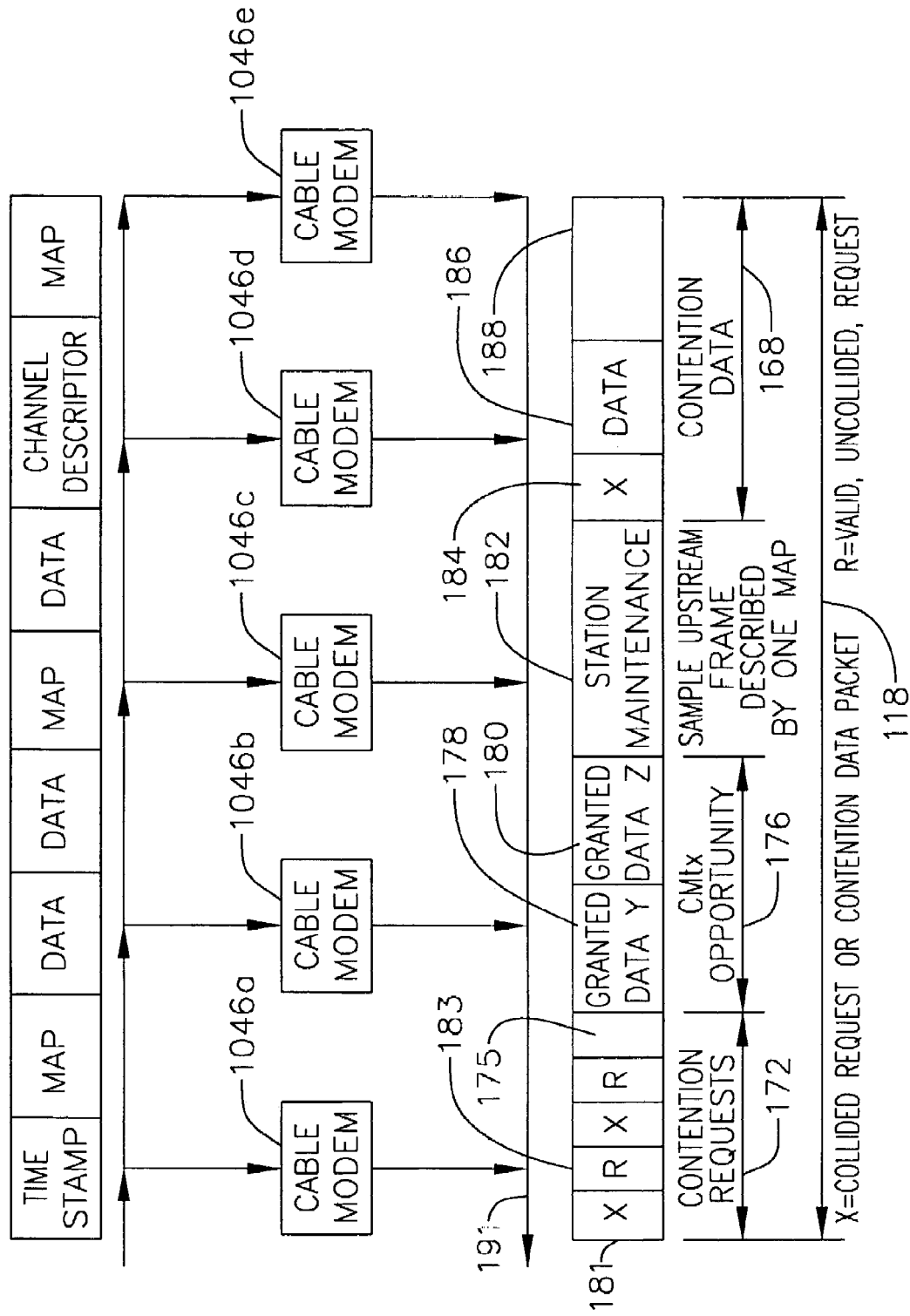

Referring now to FIGS. 6 and 7, a block diagram of that portion of the CMTS 1042 which receives requests from the CMs 1046 and which generator MAPs in response to those requests is shown. The contention data region 168 in FIG. 7 is included in frame 118 defined by a MAP 111 (FIG. 3). The frame 118 in FIG. 7 may include a number of other regions. One region is indicated at 172 and is designated as contention requests region 112 in FIG. 3. It includes slots designated as X 181. In these slots X 181, collisions between request data from different CMs 1046 have occurred. Other slots in the contention request region 172 are designated as R 183. Valid uncollided request data is present in these slots. The contention request region 172 also illustratively includes an empty slot 175. None of the subscribers 14 has made a request in this empty slot 175.

A CM transmit opportunity region 176 (corresponding to the CM transmit opportunity region 114 in FIG. 3) may also be provided in the frame 118 adjacent the contention request area 172. As previously indicated, individual CMs 1046 are assigned slots in this area for data in accordance with their requests and with the priorities given by the CMTS 1042 to these requests. Optionally, the CM transmit opportunity region 176 may be considered as having two sub-regions. In a sub-region 178, slots are specified for individual subscribers on the basis of requests of a high priority. Slots are specified in an area 180 for individual subscribers on the basis of requests of a low priority.

The frame 118 may optionally also include a maintenance region 182. This corresponds to the maintenance region 116 in FIG. 3. As previously described, the region 182 provides for a time coordination in the clock signals of the CMTS 1042 and the CMs 1046. The frame 118 additionally may optionally include a region 184 in the contention data region 168 where a collision has occurred. Valid data is provided in an area 186 in the frame where no collision occurred. A blank or empty area 188 may exist at the end of the contention data region 186 where further data could be inserted, subject to potential collisions. It will be appreciated that the different regions in the frame 118, and the sequence of these different regions, are illustrative only and that different regions and different sequences of regions may alternatively be provided.

The signals of the frames 118 from different CMs 1046a, 1046b, 1046c, 1046d, etc. (FIG. 7) are introduced in upstream data processing through a common line 191 (FIGS. 6 and 7) to a TDMA demultiplexer 192 (FIG. 6) in the CMTS 1042. After demultiplexing, data in from the CMs 1046a, 1046b, 1046c, 1046d, etc. pass from the demultiplexer 192 to a data interface 194. The signals at the data interface 194 are processed in an Ethernet system (not shown) or the like. The operation of the MAP generator 198 is controlled by data requests from the individual CMs 1046a, 1046b, 1046c, 1046d, etc. and by collision information which is indicative of the CMs 1046a, 1046b, 1046c, 1046d, etc. attempts to insert data in the contention data region 168. Thus, for example, a large number of collision may indicate a need for a larger contention request region 172 in the next MAP. Attempts to insert data in the contention data region 168 may, optionally, be utilized by the MAP generator 198 to increase the priority of any CM unsuccessfully attempting to transmit such data. The MAPs generated by the MAP generator 198 pass through the multiplexer 196 and are broadcast by the CMTS 1042 to the CMs 1046a, 1046b, 1046c, 1046d.

A sample MAP generated by the MAP generator 198 is generally indicated at 202 in FIG. 6. The MAP 202 includes a region 204 where the requests of the CMs 1046 for Information Elements-(IE) within which to transmit data are indicated. As previously indicated, an Information Element (IE) may be considered to be the same as a region. The MAP 202 also includes a region 206 where the CMTS 1042 has granted the requests of the subscribers for Information Elements to transmit data. The MAP 202 additionally includes a contention data region 208 where the CMTS 1042 has given the CMs 1046 the opportunity to transmit data in available spaces or slots without specifying the open spaces or slots where such transmission is to take place. An acknowledgment region 210 is also included in the MAP 202. In this region, the CMTS 1042 acknowledges to the CM 1046 that it has received data from the subscribers in the available slots in the contention data region 208. As discussed above, the CMTS 1042 has to provide such acknowledgment because the CMs 1046 will not otherwise know that the CMTS 1042 has received the data from the CMs 1046 in the contention data region 208.

Figure 8:
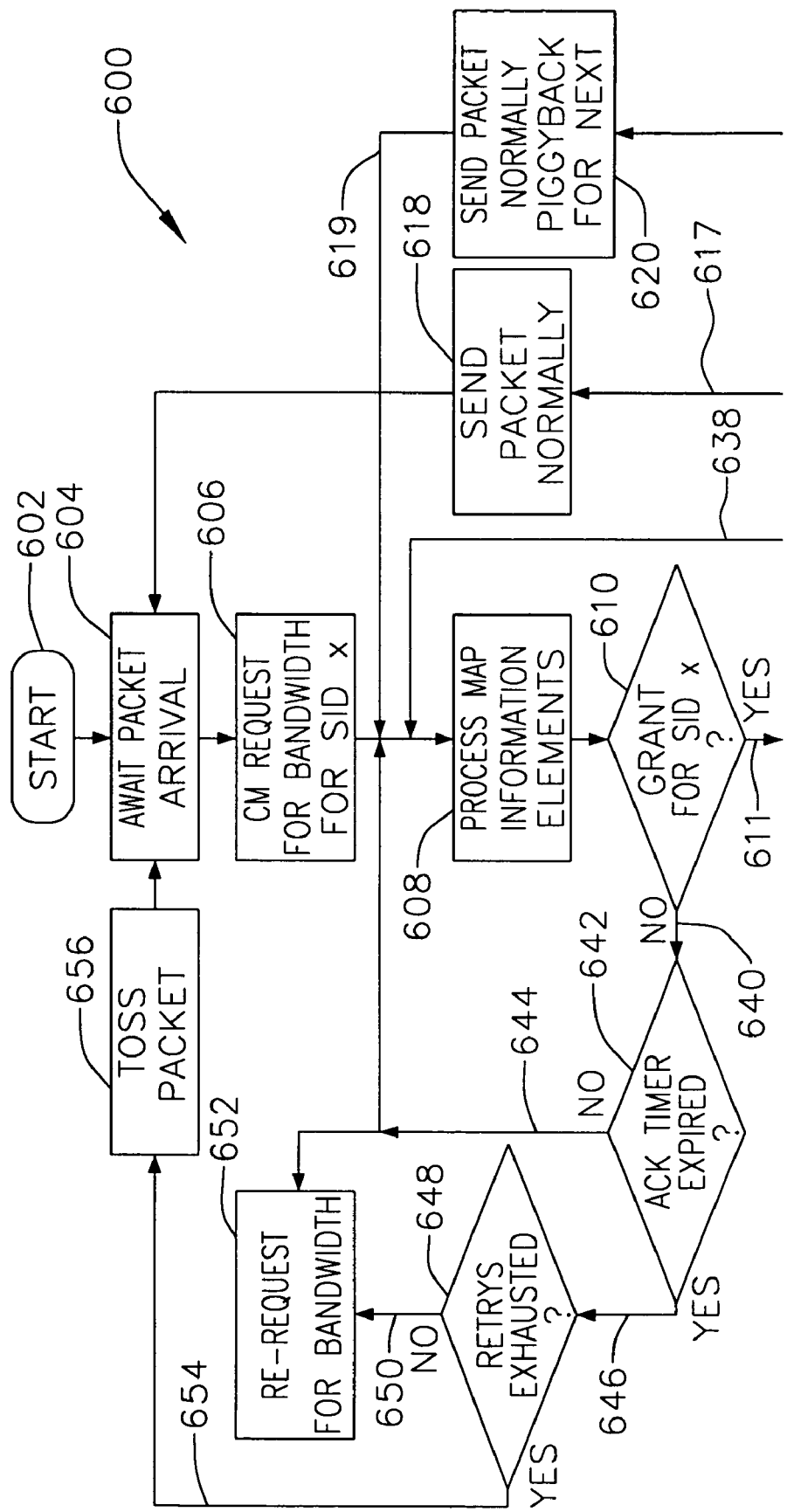
FIGS. 8 and 9 show in flow diagram form how a cable modem and cable modem termination system cooperate for packets transmitted by the cable modem to the cable modem termination system.
Figure 9:
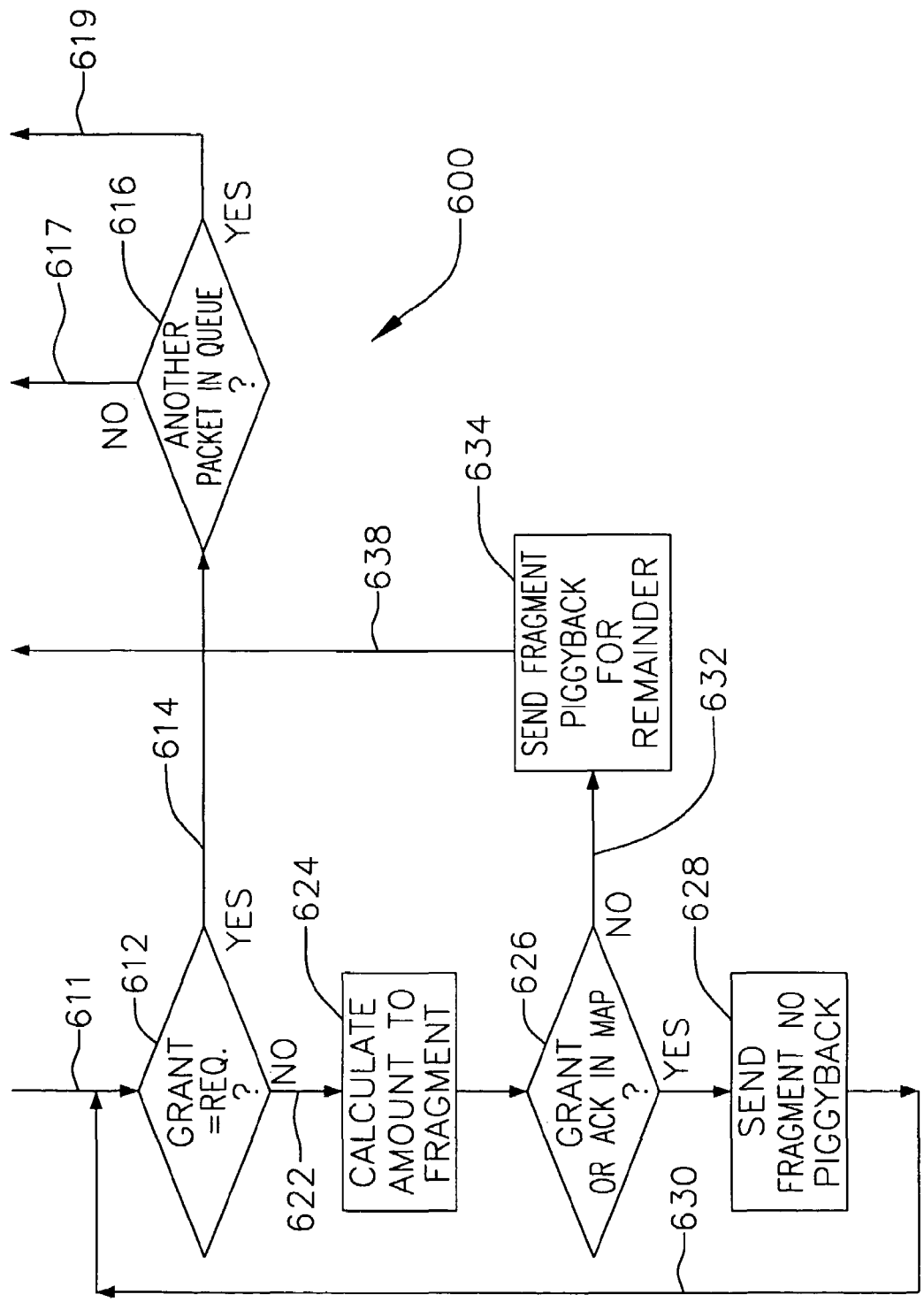

FIGS. 8 and 9 define a flowchart, generally indicated at 600, in block form and show how the CM 1046 and the CMTS 1042 cooperate for packets transmitted by the CM 1046 to the CMTS 1042. The operation of the blocks in the flowchart 600 is initiated at a start block 602. As indicated at block 604 in FIG. 8, the CM 1046 then awaits a packet from an external source. For example, the external source may be a personal computer (PC) 1048, or bit-rate sampled data transmission device 1047a, 1047b (FIG. 2) at the home 1014 of a subscriber. As shown in block 606, the CM 1046 then submits to the CMTS 1042 a bandwidth request for enough time slots to transmit the packet. Upon receipt of the request, the CMTS sends a grant or partial grant to the CM in the MAP. The CM 1046 then checks at block 610 to determine if the CMTS 1042 has granted the request, or any portion of the request, from the CM 1046. In block 610, SID is an abbreviation of Service Identification, for example, a SID assigned to bit-rate sampled data transmission-device 1047a. If the answer is "Yes" (see line 611 in FIGS. 8 and 9), the CM 1046 then determines if the CMTS 1042 has granted the full request from the CM 1046 for the bandwidth. This corresponds to the transmission of the complete data packet from the CM 1046 to the CMTS 1042. This is indicated at block 612 in FIG. 9.

If the answer is "Yes", as indicated at block 614 in FIG. 9, the CM 1046 determines if there is another packet in a queue which is provided to store other packets awaiting transmission to the CMTS 1042 from the CM 1046. This determination is made at block 616 in FIG. 8. If there are no other packets queued, as indicated on a line 617 in FIGS. 8 and 9, the CM 1046 sends the packet without a piggyback request to the CMTS 1042 (see block 618 in FIG. 8) and awaits the arrival of the next packet from the external source as indicated at 604. If there are additional packets queued as indicated by a line 619 in FIGS. 8 and 9, the CM 1046 sends to the CMTS 1042 the packet received from the external source and piggybacks on this transmitted packet a request for the next packet in the queue. This is indicated at 620 in FIG. 10. The CM then returns to processing MAPs at 608 looking for additional grants. The CMTS 1042 then processes the next request from the CM.

The CMTS 1042 may not grant the full request for bandwidth from the CM 1046 in the first MAP 111. The CMTS 1042 then provides this partial grant to the CM 1046. If the CMTS operates in multiple grant mode, it will place a grant pending or another grant in the MAP in addition to the partial grant it sends to the CM. The CM processes the MAPs as shown in 608 and sees the grant in 611. The grant is smaller than the request as on 622 so the CM calculates the amount of the packet that will fit in the grant as on 624. With a multiple grant mode CMTS, the CM will see the partial grant with an additional grant or grant pending in subsequent MAPs as in 610 and 611. The CM then sends the fragment, without any piggyback request as in 628 and 630 to the CMTS 1042. The CM returns to processing MAP information elements in 608 until it gets to the next grant. The CM then repeats the process of checking to see if the grant is large enough as in 612. If the next grant is not large enough, the CM repeats the process of fragmenting the remaining packet data and, as in 626, checking to see if it needs to send a piggyback request based on additional grants or grant pendings in the MAP. If the grant is large enough to transmit the rest of the packet as on 614, the CM checks to see if there is another packet enqueued for this same SID. If so, the CM sends the remaining portion of the packet with the fragmentation header containing a piggyback request for the amount of time slots needed to transmit the next packet in the queue as on line 620. The CM then returns to processing the MAP information elements. If there is not another packet enqueued for this SID, then the CM sends the remaining portion of the packet with fragmentation header containing no piggyback request as shown in 618. The CM then returns to 604 to await the arrival of another packet for transmission. When the CMTS 1042 partially grants the request from the CM 1046 in the first MAP 11 and fails to provide an additional grant or grant pending to the CM 1046 in the first MAP, the CM will not detect additional grants or grant pendings as on 632. The CM 1046 then sends to the CMTS 1042 a fragment of the data packet and a piggyback request for the remainder as in 634. When the CM has transmitted the fragment with the piggybacked request as shown on line 638, the CM returns to processing MAP information elements as in 608 while waiting for additional grants. When the CMTS receives the fragment with the piggybacked request, the CMTS must decide whether to grant the new request or send a partial grant based on the new request. This decision is based on the scheduling algorithms implemented on the CMTS.

Any time during the request/grant process, the CMTS could fail to receive a request or the CM could fail to receive a grant for a variety of reasons. As a fail safe mechanism, the CMTS places an acknowledgment time, or ACK time, in the MAPs it transmits. This ACK time reflects the time of the last request it has processed for the current MAP. The CM uses this ACK time to determine if its request has been lost. The ACK timer is said to have "expired" when the CM is waiting for a grant and receives a MAP with an ACK time later in time than when the CM transmitted its request. As the CM is looking for grants at 610, if the ACK time has not expired as on 644, the CM returns to processing the MAPs as in 608. If the ACK timer does expire as on 646, the CM checks to see how many times it has retried sending the request in 648. If the number of retries is above some threshold, the retries have been exhausted as on 654 and the CM tosses any untransmitted portion of the packet at 656 and awaits the arrival of the next packet. If the ACK timer has expired and the number of retries have not been exhausted as in 650, the CM uses a contention request region to transmit another request for the amount of time slots necessary to transmit the untransmitted portion of the packet as in 652. The CM then returns to processing the MAPS.

Figure 10:
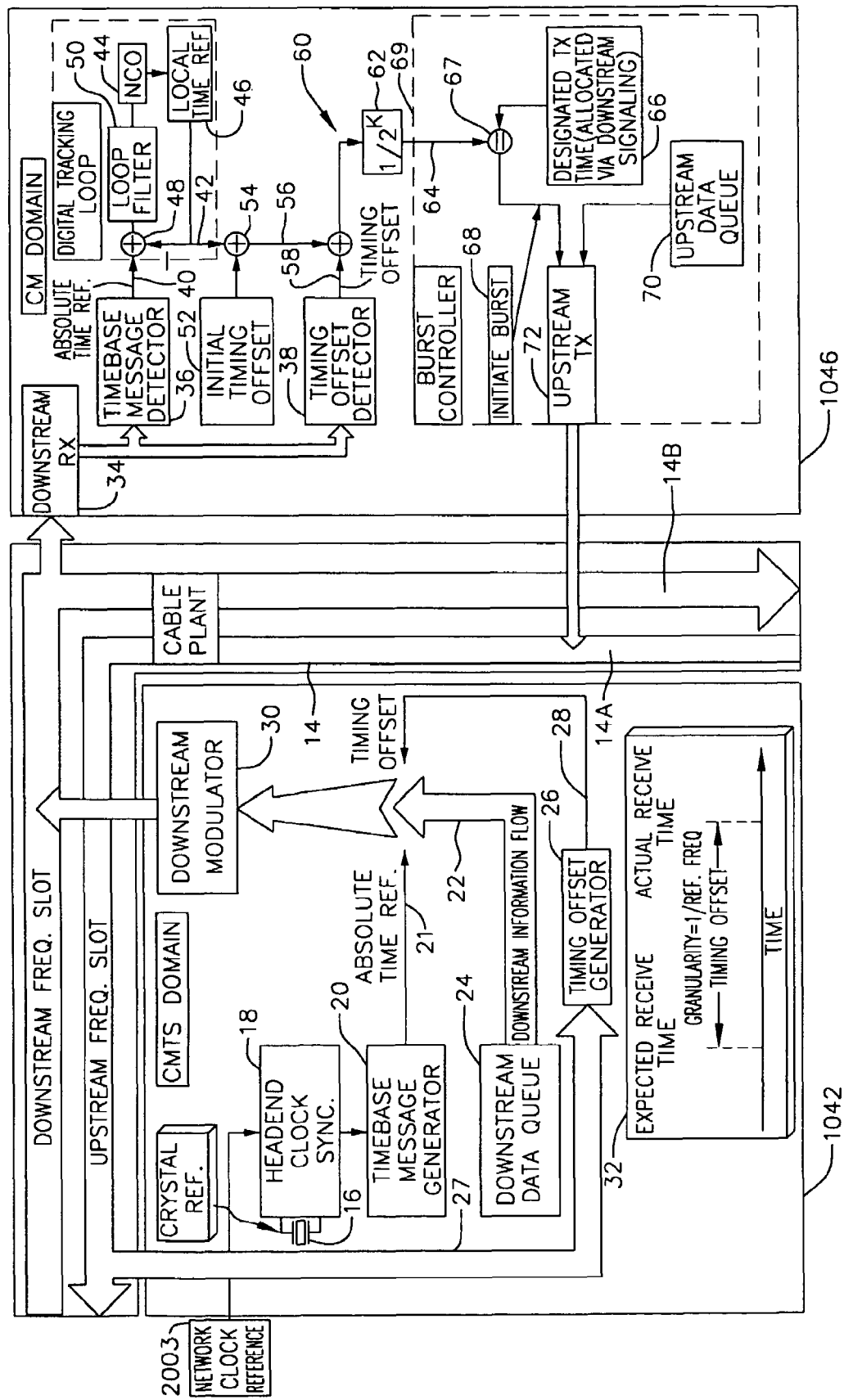
FIGS. 10 and 11 show in block diagram form aspects of the timing synchronization system between the cable modem and the cable modem termination system.

Referring to FIG. 10, the CMTS 1042 includes a crystal oscillator timing reference 16 which provides an output to a headend clock synchronization circuitry 18. It is this timing reference 16 to which each of the CMs 1046 must be synchronized. Headclock clock synchronization circuitry also receives an input from network clock reference 2003, which will be discussed in more detail below. The headend clock synchronization circuit 18 is incremented by the output of the crystal oscillator timing reference 16 and maintains a count representative of the number of cycles provided by the crystal oscillator timing reference 16 since the headend clock synchronization circuit 18 was last reset. The headend clock synchronization circuit 18 includes a free-running counter having a sufficient count capacity to count for several minutes before resetting.

A timebase message generator 20 receives the count of the headend clock synchronization circuit 18 to provide an absolute time reference 21 which is inserted into the downstream information flow 22 provided by downstream data queue 24, as discussed in detail below. The timebase message generator 20 prefers a module function, i.e., a saw tooth pattern as a function of time) and the counter clock is generated by the oscillator with very tight accuracy.

Timing offset generator 26 receives a ranging signal message 27 from each individual CM 1046 with which the CMTS is in communication. The slot timing offset generator 26 provides a slot timing offset 28 which is representative of a slot timing offset between the CMTS 1042 and the CM 1046 and inserts the slot timing offset 28 into the downstream information flow 22. The slot timing offset 28 is calculated by determining the position of the slot timing offset from the expected time 27 within a dedicated timing slot of the upstream communications, as discussed in detail below. The timing effort generator 26 encodes the timing offset (ranging error) detected by the upstream receiver into a slot timing offset message. Slot timing offset messages are sent only after the frequency of the local reference clock has been acquired by the CM.

Downstream modulator 30 primarily modulates the downstream information flow 22. Absolute time references 21 are inserted at quasi-periodic intervals as determined by a timestamp send counter. A slot timing offset message 28 is inserted after measuring the slot timing error upon the arrival of a ranging signal message 27.

The time line 32 of the CMTS 1042 shows that the slot timing offset 28 is the difference between the expected receive time and the actual receive time of the slot timing offset message 27.

Each CM 1046 includes a downstream receiver 34 for facilitating demodulation of the data and timestamp message, and timing recovery of downstream communications from the CMTS 1042. The output of the downstream receiver 34 is provided to timebase message detector 36 and slot timing offset detector 38. The downstream information (any data communication, such as a file transfer or MPEG video signal) received by the downstream receiver 34 is also available for further processing, as desired.

The timebase-message detector 36 detects the timebase message generated by timebase message generator 20 of the CMTS 1042. Similarly, the slot timing offset detector 38 detects the slot timing offset 28 generated by the slot timing offset generator 26 of the CMTS 1042. The timebase message detector 36 provides an absolute time reference 40 which is representative of the frequency of the crystal oscillator timing reference 16 of the CMTS 1042. The absolute time reference 40 is provided to a digital tracking loop 42 which provides a substantially stable clock output for the CM 1046 which corresponds closely in frequency to the frequency of the crystal oscillator timing reference 16 of the CMTS 1042. Thus, the digital tracking loop 42 uses the absolute time reference 40, which is representative of the frequency of the crystal oscillator timing reference 16, to form an oscillator drive signal which drives a numerically controlled oscillator 44 in a manner which closely matches the frequency of the crystal oscillator timing reference 16 of the CMTS 1042, as discussed in detail below.

A difference between the absolute time reference 40 and the output of a local time reference 46, which is derived from the numerically controlled oscillator 44, is formed by differencing circuit 48. This difference defines a frequency error value which represents the difference between the clock of the CM 1046 (which is provided by local time reference 46) and the clock of the CMTS 1042 (which is provided by crystal oscillator timing reference 16).

This frequency error value is filtered by loop averaging filter 50 which prevents undesirable deviations in the frequency error value from affecting the numerically controlled oscillator 44 in a manner which would decrease the stability thereof or cause the numerically controlled oscillator 44 to operate at other than the desired frequency. The loop filter 50 is configured so as to facilitate the rapid acquisition of the frequency error value, despite the frequency error value being large, and then to reject comparatively large frequency error values as the digital tracking loop 42 converges, i.e., as the output of the local time reference 46 becomes nearly equal to the absolute time reference 40, thereby causing the frequency error value to approach zero.

An initial slot timing offset 52 is added by summer 54 to the output of the local time reference 46 to provide a partially slot timing offset corrected output 56. The partially slot timing offset corrected output 56 of summer 54 is then added to slot timing offset 58 provided by slot timing offset detector 38 to provide slot timing offset and frequency corrected time reference 60. The timing offset correction block is a simple adder which adds two message values. Such simplified operation is facilitated only when the resolution of the timing offset message is equal to or finer than that of the timestamp message.

The initial slot timing offset 52 is merely an approximation of the expected slot timing offset likely to occur due to the propagation and processing delays, whose approximate values have been predetermined. After frequency conversion using the phase locked loop and timebase message error, the slot timing offset 58 provides a final correction which is calculated by the CMTS 1042 in response to the CMTS 1042 receiving communications from the CM 1046 which are not properly centered within their desired timing slots, as discussed in detail below.

Scaler 62 scales the frequency corrected-time reference 60 so as to drive upstream transmitter 69 at the desired slot timing.

Time reference 64 is compared to the designated transmit time 66 which was allocated via downstream communication from the CMTS 1042 to the CM 1046. When the time reference 64 is equal (at point 67) to the designated transmit time, then an initiate burst command 68 is issued and the upstream data queue 70 is modulated to form upstream transmission 72.

The timing offset (error) message is generated by the CMTS. The timing offset (error) is simply the difference between the expected time and the actual arrival time of the ranging message at the CMTS burst receiver.

Still referring to FIG. 10, although only one CM 1046 is shown in FIG. 10 for clarity, the CMTS 1042 actually communicates bidirectionally with a plurality of such CMs 12. Such communication as discussed herein may actually occur between the CM system and the plurality of CMs by communicating simultaneously with the CMs on a plurality of separate frequency channels. The present invention addresses communication of a plurality of different CMs on a single frequency channel in a serial or time division multiplexing fashion, wherein the plurality of CMs communicate with the CMTS sequentially. However, it will be appreciated that while this plurality of CMs is communicating on one channel with the CMTS (using time division multiple access or TDMA), many other CMs may be simultaneously communicating with the same CMTS on a plurality of different channels (using frequency division multiplexing/time division multiple access or FDM/TDMA).

Figure 11:
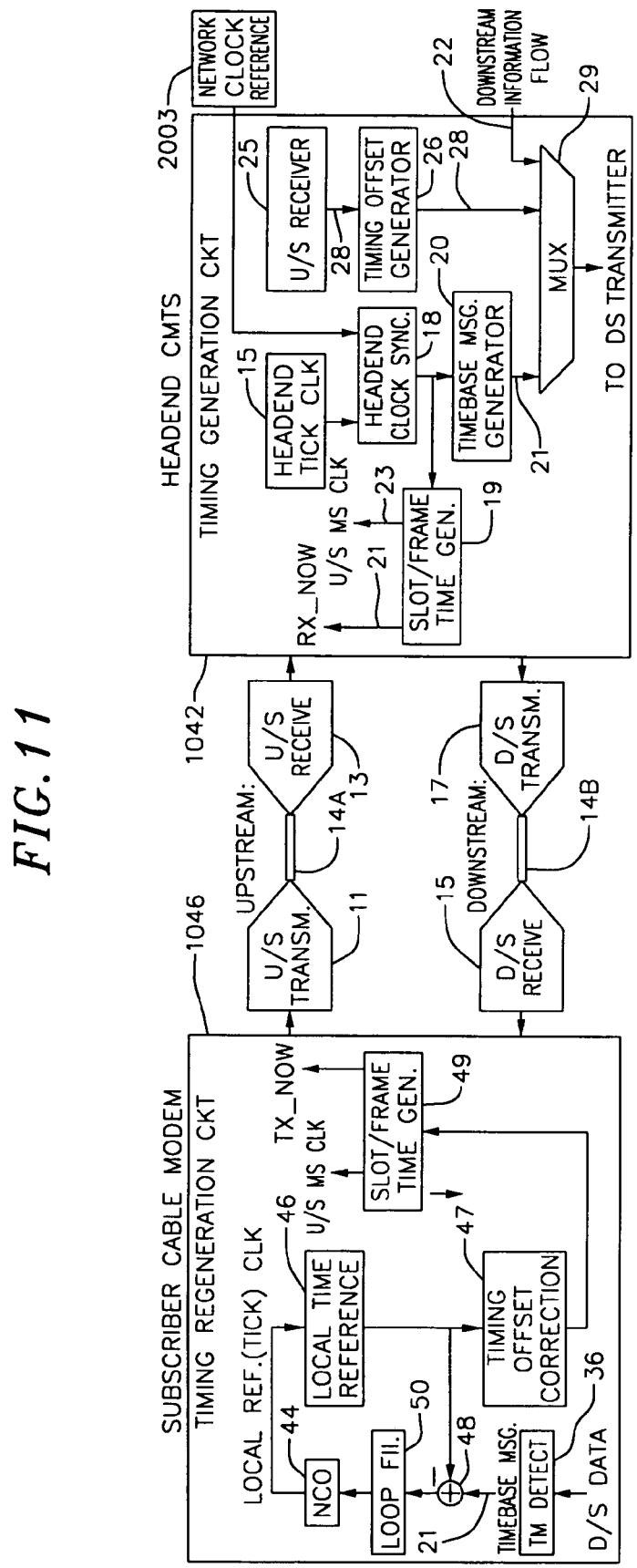

Referring now to FIG. 11, the CMTS 1042 and the CM 1046 are described in further detail. The multiplexer 29 of the CMTS 1042 combines downstream information flow 22 with slot timing offset 28 from slot timing offset generator 26 and with absolute time reference 21 from timebase message generator-20 to provide downstream communications to the downstream transmitter, which includes downstream modulator 30 (FIG. 10). The slot timing offset generator 26 receives a slot timing offset signal 28 from the upstream receiver 25. The location of the slot timing offset signal within a timing slot of an upstream communication defines the need, if any, to perform a slot timing offset correction. Generally, a slot timing offset value will be transmitted, even if the actual slot timing offset is 0. When the slot timing offset message is desirably located within the timing offset slot, and does not extend into guard bands which are located at either end of the timing offset slot, then no slot timing offset correction is necessary.

However, when the slot timing offset message extends into one of the guard bands of the timing offset slot of the upstream communication, then a slot timing offset 28 is generated by the slot timing offset generator 26, which is transmitted downstream to the CM 1046 where the slot timing offset 28 effects a desired correction to the time at which upstream communications occur, so as to cause the slot timing offset message and other transmitted data to be positioned properly within their upstream data slots.

The headend tick clock 15 includes the crystal reference 16 of FIG. 10 and provides a clock signal to linear counting sequence generator 18. Slot/frame time generator 19 uses a clock signal provided by headend clock synchronization circuit 18 to provide both an minislot clock 21 and a receive now signal 23. The upstream message clock 21 is the clock by which the message slots are synchronized to effect time division multiple access (TDMA) communications from each CM 1046 to the CMTS 1042. A Transmit now signal is generated at the beginning of each minislot of a transmission. A Receive now signal is similarly generated at the beginning of a received packet.

A minislot is a basic medium access control (MAC) timing unit which is utilized for allocation and granting of—time division multiple access (TDMA) slots. Each minislot may, for example, be derived from the medium access control clock, such that the minislot begins and ends upon a rising edge of the medium access control clock. Generally, a plurality of symbols define a minislot and a plurality of minislots define a time division multiple access slot.

The CM 1046 receives downstream data from the downstream channel 14B. A timebase message detector 36 detects the presence of a timebase message 21 in the downstream data.

Slot timing offset correction 47 is applied to upstream communications 14A prior to transmission thereof from the subscriber CM 1046. The slot timing offset correction is merely the difference between the actual slot timing offset and the desired slot timing offset. Thus, the slot timing offset correction is generated merely by subtracting the actual slot timing offset from the desired offset. Slot/frame timing generator 49 transmits the upstream data queue 70 (FIG. 10) at the designated transmit time 66 (FIG. 10).

Summer 48 subtracts from the timebase message 21 of the local time reference 46 and provides an output to a loop filter 50 which drives numerically controlled oscillator 44, as discussed in detail below.

Upstream transmitter 11 facilitates the transmission of upstream communications 14A from the subscriber CM 1046A and upstream receiver 13A facilitates the reception of the upstream communications 14A by the CMTS 10.

Downstream transmitter 17 facilitates the transmission of downstream communications 14 from the CMTS 16 to the CM 1046 where downstream receiver 15 facilitates reception thereof.

Figure 12:
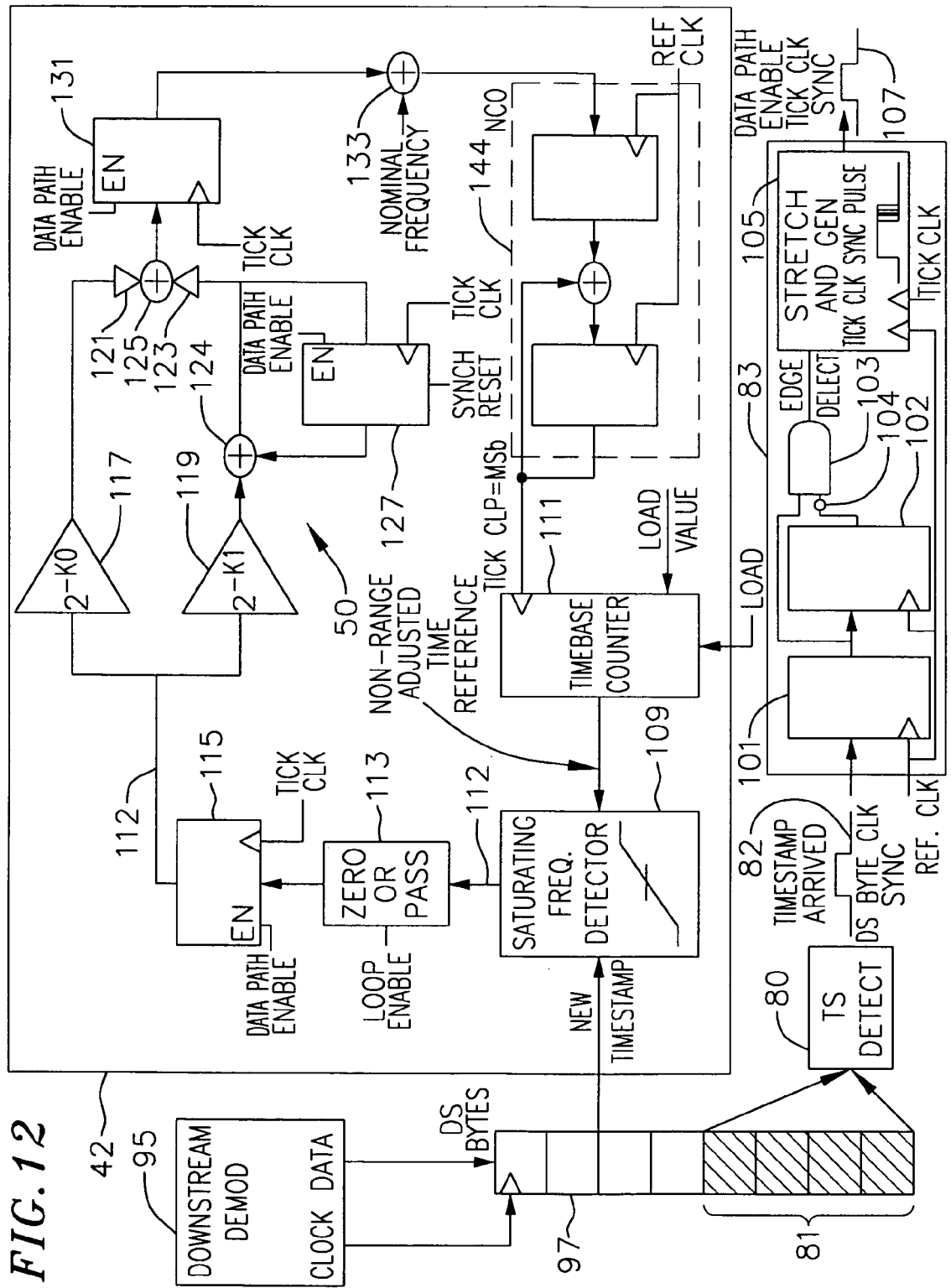
FIG. 12 shows in block diagram form an exemplary timing recovery circuit of a cable modem in more detail.

Referring now to FIG. 12, an exemplary timing recovery circuit of a CM is shown in further detail. Downstream demodulator 95, which forms a portion of downstream receiver 15 of FIG. 11, provides clock and data signals which are derived from downstream communications 14B (FIG. 11). The data signals include downstream bytes which in turn include the count or timestamp 97 and timebase message header 81 transmitted by the CMTS 1042. Slot timing offset messages are included in the downstream flow of downstream data.

Timestamp detector 80 detects the presence of a timestamp header 81 among the downstream bytes and provides a timestamp arrived signal 82 which functions as a downstream byte clock sync. The timestamp arrived signal 82 is provided to synchronizer 83 which includes register 101, register 102, AND gate 103, inverter 104 and latch 105. Synchronizer 103 synchronizes the timestamp arrived signal 82 to the clock of the CM 1046, to provide a data path enable tick clock sync 107 for enabling the digital tracking loop 42.

When the digital tracking loop 42 is enabled by the data path enable tick clock sync 107 output from the synchronizer 83 in response to detecting a timestamp header by timestamp detector 80, then the timestamp, which is a count provided by the headend clock synchronization circuit 18 of FIG. 11, is provided to the digital tracking loop 42 and the digital tracking loop 42 is enabled so as to process the timestamp.

A differencing circuit or saturating frequency detector 109 compares the timestamp to a count provided to the saturating frequency detector 109 by timebase counter 111 which is representative of the frequency of numerically controlled oscillator 44. The saturating frequency detector 109 provides a difference signal or frequency error value 112 which is proportional to the difference between the frequency of the numerically controlled oscillator 44 of the CM and the crystal oscillator reference 16 of the CMTS.

If the difference between the value of the timestamp and the count of timebase counter 111 is too large, indicating that the timestamp may be providing an erroneous value, then the saturating frequency detector 109 saturates and does not provide an output representative of the difference between the value of the timestamp and the count of timebase counter 111. In this manner, erroneous timestamps are not accepted by the digital tracking loop 42.

Pass 113 loop enable allows the difference provided by the saturating frequency detector 109 to be provided to latch 115 when a global enable is provided thereto. The global enable is provided to zero or pass 113 when functioning of the digital tracking loop 42 is desired.

Latch 115 provides the frequency error value 112 to a loop filter which includes multipliers 117 and 119, scalers 121 and 123, summers 124, 125 and latch 127.

The multipliers 117 and 119 include shift registers which effect multiplication by shifting a desired number of bits in either direction. Scalers 121 and 0.123 operate in a similar manner.

The loop filter functions according to well-known principles to filter out undesirable frequency error values, such that they do not adversely affect the stability or operation of numerically controlled oscillator 44. Thus, the loop filter tends to smooth out undesirable deviations in the frequency error value signal, so as to provide a more stable drive signal for the numerically controlled oscillator 44.

The multipliers 117 and 119 can be loaded with different coefficients such that the bandwidth of the loop filter may be changed from a larger bandwidth during initial acquisition to a smaller bandwidth during operation. The larger bandwidth used initially facilitates fast acquisition by allowing frequency error values having larger deviations to be, accepted. As the digital tracking loop 42 converges, the frequency error value tends to become smaller. At this time, frequency error values having larger deviations would tend to decrease stability of the digital tracking loop 42 and are thus undesirable. Therefore, different coefficients, which decrease the bandwidth of the loop filter, are utilized so as to maintain stability of the digital tracking loop 42.

A table showing an example of coarse and fine coefficients K0 and K1 which are suitable for various different update rates and bandwidths are shown in FIG. 13.

The output of the loop filter is provided to latch 131. The output of latch 131 is added to a nominal frequency by summer 133 so as to define a drive signal for numerically controlled oscillator 44.

Those skilled in the art will appreciate that the addition of a frequency offset, if properly programmed to a normal frequency, will decrease the loop's acquisition time. This is due to the fact that the final value of the accumulator 127 will be closer to its initial value.

The nominal frequency is generally selected such that it is close in value to the desired output of the numerically controlled oscillator 44. Thus, when the numerically controlled oscillator 44 is operating at the desired frequency, the filtered frequency error value provided by latch 131 is nominally zero.

Referring now to FIG. 14, a slot timing offset between the clock of the CM 1046 and the clock of the CMTS 1042 must be determined so as to assure that messages transmitted by the CM 1046 are transmitted during time slots allocated by the CM system 10. As those skilled in the art will appreciate, propagation delays 400 and processing delays 402 combine to cause the CM 1046 to actually transmit at a later point in time than when it is requested to do so by the CMTS 1042. Thus, a slot timing offset must be provided to each CM 1046, to assure that it transmits at the correct time. This slot timing offset is determined by the CMTS 1042 by having the CMTS 1042 monitor a dedicated slot timing offset slot in upstream communications so as to determine the position of a slot timing offset message therein. The position of the slot timing offset message within the dedicated slot timing offset slot in the upstream communication determines the slot timing offset between the clock of the CMTS 1042 and the clock of the CM 1046. Thus, the CMTS 1042 may use this error to cause the CM 1046 to transmit at an earlier point in time so as to compensate for propagation and processing delays. This slot timing offset correction is equal to 2Tpg+ Tprocess.

Initially, the slot timing offset slot includes a comparatively large time slot, i.e., having comparatively large guard times, so as to accommodate comparatively large slot timing offset error. In a normal data packet, the width of the timing offset slot may be reduced when slot timing offset errors become lower (thus requiring smaller guard bands), so as to facilitate more efficient upstream communications.

Generally, communications will be initialized utilizing a comparatively large guard time. After acquisition, when slot timing accuracy has been enhanced, then the guard time may be reduced substantially, so as to provide a corresponding increase in channel utilization efficiency.

According to a further aspect of the present invention, data packets are acquired rapidly, e.g., in an order of sixteen symbol or so, so as to facilitate enhanced efficiency of bandwidth usage. As those skilled in the art will appreciate, it is desirable to acquire data packets as fast as possible, so as to minimize the length of a header, preamble or other non-information bearing portion of the data packet which is used exclusively for such acquisition.

As used herein, acquisition is defined to include the modifications or adjustments made to a receiver so that the receiver can properly interpret the information content of data packets transmitted thereto. Any time spent acquiring a data packet detracts from the time available to transmit information within the data packet (because of the finite bandwidth of the channel), and is therefore considered undesirable.

Acquisition includes the performance of fine adjustments to the parameters which are defined or adjusted during the ranging processes. During the ranging processes, slot timing, carrier frequency, and gross amplitude (power) of the data packet are determined. During acquisition, these parameters are fine-tuned so as to accommodate fractional symbol timing, carrier phase correction and fine amplitude of the data packet.

Moreover, a ranging process is used to control power, slot timing and carrier frequency in the upstream TDMA channel. Power must be controlled so as to provide normalized received power at the CMTS, in order to mitigate interchannel interference. The carrier frequency must be controlled so as to ensure proper channelization in the frequency domain. Slot timing must be controlled so as to mitigate the undesirable collision of data packets in the time domain and to account for differential propagation delays among different CMs.

Figure 15:
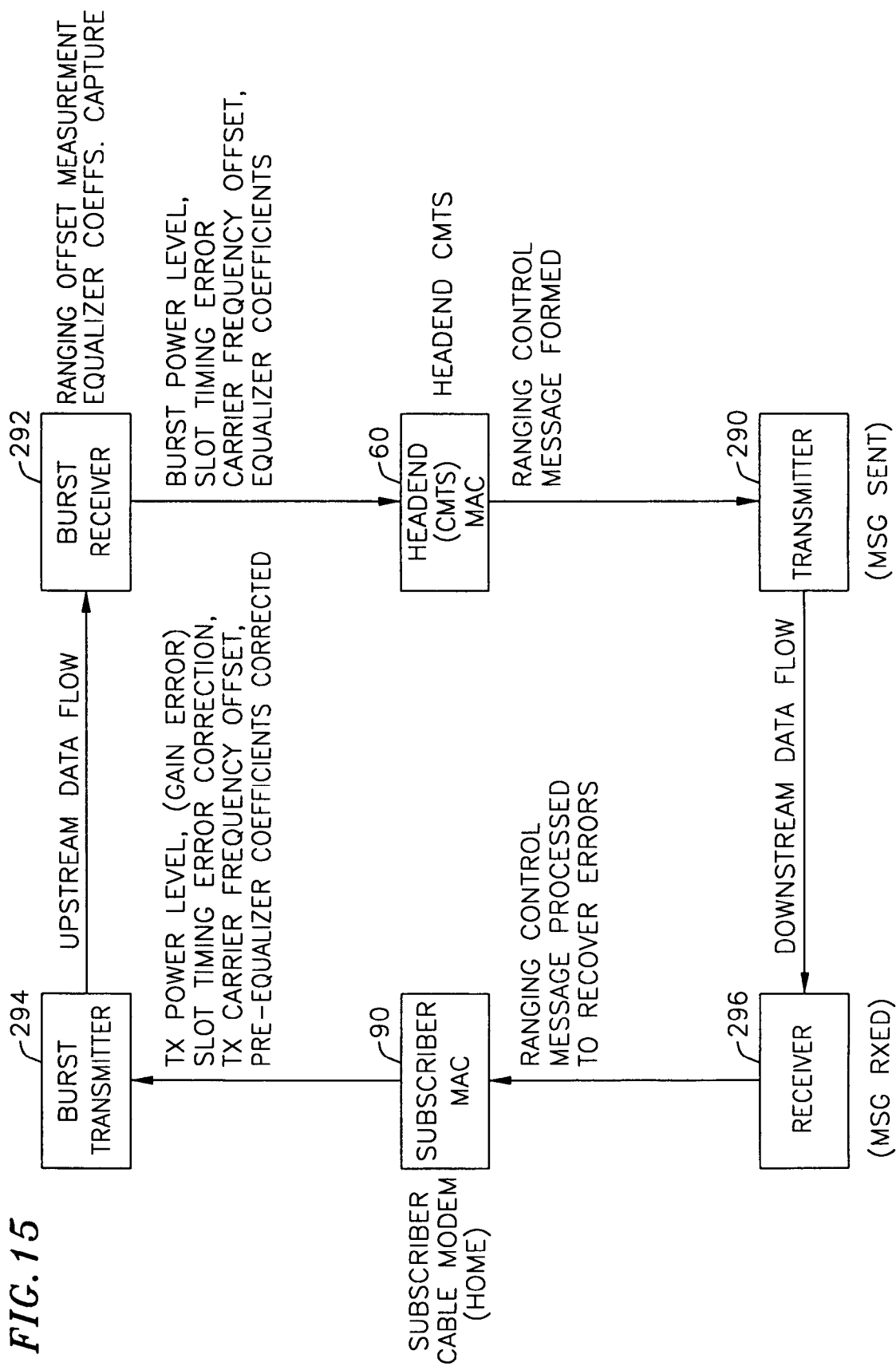
FIG. 15 shows in simplified block diagram form the burst transmission and reception by the cable modem and the cable modem termination system.

Referring now to FIG. 15, the CMTS 1042 comprises a burst receiver 292 for receiving data packets in the upstream data flow, a continuous transmitter 290 for broadcasting to the CMs 1046 via the downstream data flow and a medium access control (MAC) 60 for providing an interface between the burst receiver 292, the continuous transmitter 290 and other headend communications devices such as video servers, satellite receivers, video modulators, telephone switches and Internet routers 1018 (FIG. 2).

Each CM 46 (FIG. 2) comprises a burst transmitter 294 for transmitting data to the CMTS 1042 via upstream data flow, a continuous receiver 296 for receiving transmissions from the CMTS 1042 via the downstream data flow and medium access control (MAC) 90 for providing an interface between the burst transmitter 294, the continuous receiver 296 and subscriber communications equipment such as a PC 48 (FIG. 2), a telephone, a television, etc.

The burst receiver 292, medium access control (MAC) 60 and continuous transmitter 290 of the CMTS 1042 and the burst transmitter 294, medium access control (MAC) 90 and continuous receiver 296 of each CM may each be defined by a single separate, integrated circuit chip.

Figure 16:
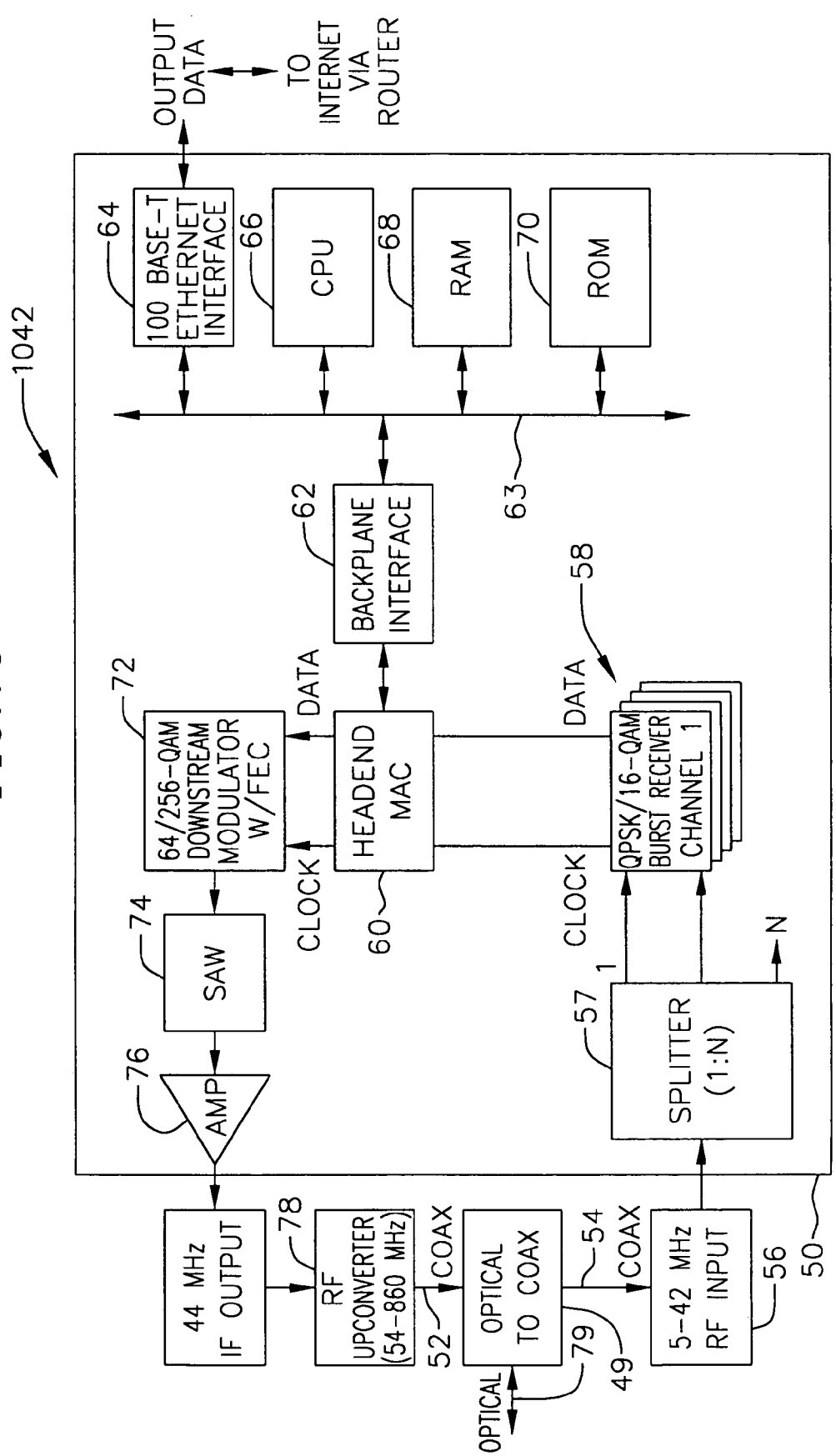
FIG. 16 shows the cable modem termination system in further detail.

Referring now to FIG. 16, the CMTS 1042 of FIG. 2 is shown in further detail. The CMTS 1042 is configured to receive signals from and transmit signals to an optical fiber 79 of the HFC network 1010 (FIG. 2) via optical-to-coax stage 49, which is typically disposed externally with respect to the CMTS 1042. The optical-to-coax stage 49 provides an output to the 5–42 MHz RF input 56 via coaxial cable 54 and similarly receives a signal from the RF up converter 78 via coaxial cable 52.

The output of the RF input 56 is provided to splitter 57 of the CMTS 1042, which separates the 5–42 MHz RF input into N separate channels. Each of the N separate channels is provided to a separate QPSK/16-QAM burst receiver channel 58.

Each separate QPSK/16-QAM burst receiver channel 58 is in electrical communication with the headend MAC 60. The headend MAC 60 is in electrical communication with backplane interface 62 which provides an interface to ROM 70, RAM 68, CPU 66, and 100BASE-T Ethernet interface 64. The headend MAC 60 provides clock and a data output to the downstream modulator 72 which provides an output to amplifier 76 through surface acoustic wave (SAW) filter 74. Amplifier 76 provides an output to 44 MHz IF output, which in turn provides an output to the RF upconverter 78.

Each burst receiver 58 is configured so as to be capable of receiving both QPSK (4-QAM) or 16-QAM signals. The QPSK signals provide 2 bits per symbol, wherein each bit has ±1 amplitude levels. The 16-QAM signals provide 4 bits per symbol, each bit having a ±1 or ±3 amplitude level.

However, the description and illustration of a burst receiver configured to accommodate QPSK and 16-QAM inputs is by way of illustration only and not by way of limitation. Those skilled in the art will appreciate that other modulation techniques, such as 32-QAM, 64-QAM and 256-QAM may alternatively be utilized.

Sample and Packet Synchronization

In addition to the above-mentioned standard request/grant processing, the well-known Data over Cable Service Interface Specifications (DOCSIS) provide for an Unsolicited Grant mode. In accordance with this mode, a fixed number of mini-slots are granted to a selected SID without having to suffer the delay of having a steady stream of requests prior to receipt of corresponding grants. Upstream bandwidth is allocated in discrete blocks at scheduled intervals. The block size and time interval are negotiated between the CM and the CMTS. In other words, given an initial request, the CMTS schedules a steady stream of grants at fixed intervals. The beginning mini-slot of these unsolicited grants will begin a fixed number of mini-slots from the end of the last similar grant. This mechanism can thereby provide a fixed bit rate stream between the CM and CMTS which is particularly useful for packet voice systems which sample the voice at a fixed interval (8 kHz) and assemble a fixed length packet for transport. Such fixed sampling and fixed length packet processing make the use of such fixed grant intervals particularly attractive.

Figure 17:
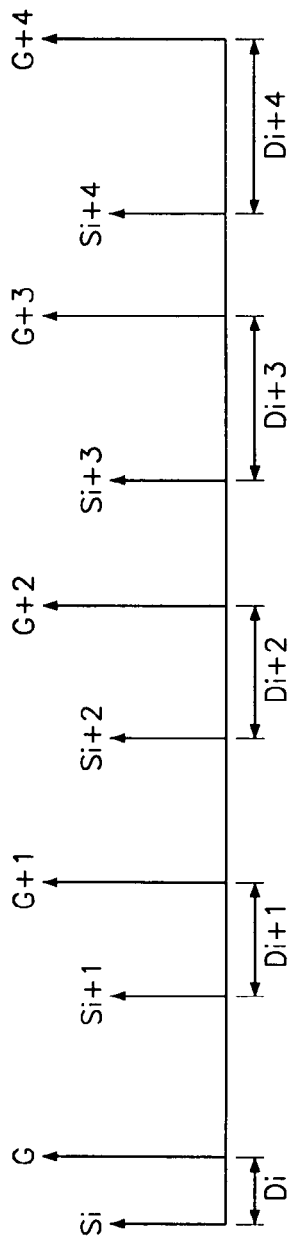
FIGS. 17, 18 and 19 shows in graphical form relationships between grants and samples.

However, if voice samples are collected using an asynchronous clock with respect to the clock associated with the mini-slots, packets will arrive at an arbitrary time with respect to the burst. The time difference (D) between the burst and packet arrival will continuously vary from burst to burst as a function of the difference between the sample and mini-slot clock frequency. FIG. 17 shows the variable delays that result when such voice services are transmitted using the DOCSIS Unsolicited Grant mode. Sample packets (Si, Si+1, . . . ) arrive based upon the sample clock and upstream grants (G, G+1, . . . ) arrive based upon the network clock derived from the CMTS network clock. The delay (Di, Di+1, . . . ) between the sample packet available and the grant arrival varies with every packet as a function of the difference between the sample and network clocks.

However, DOCSIS systems generate a clock used to synchronize the upstream transmission functions. A protocol is defined that provides a synchronized version of the CMTS clock at each CM modem, as has been described in detail hereinabove. A protocol can also be defined that provides synchronization between the voice sample clock and the CM. Similarly, when the Headend communicates with the PSTN through a PSTN Gateway which has its own clocking, a protocol can also be defined that provides synchronization between the PSTN and the Headend. Accordingly, synchronization can then be provided such that the caller voice sampling is synchronized with the CM, which, in turn, is synchronized with the CMTS, which, in turn, is synchronized with the PSTN, ultimately allowing the called destination to be synchronized with the caller. The present invention provides such synchronization.

Figure 18:
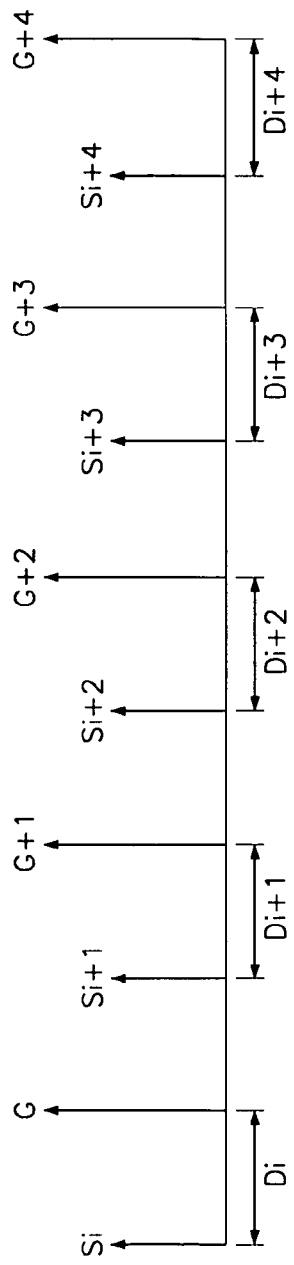
Figure 19:
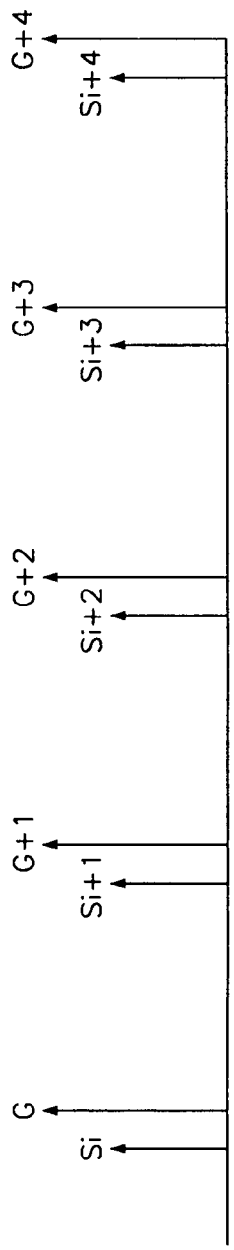

Referring to FIG. 18 there is depicted as in FIG. 17, a series of grants (G, G+1, . . . ) and a series of voice samplings (Si, Si+1, . . . ) wherein the delays (Di, Di+1, . . . ) between the sample packet arrival and the unsolicited grant arrival is fixed. The fixed delay is a result of synchronization-between the CM and the local telephone system as hereinbelow described. The fixed delay is arbitrary and is determined by the random relationship between the start of the call event and the grant timing. It is desirable, however, to minimize the delay between the packet arrival and the grant arrival as set forth in FIG. 19.

In accordance with the present invention, a coordination is provided between the grant arrival processing and the packet arrival assembly processing to help minimize such delay.

The arrival of the grant signal at the CM indicates that "it now is the time for the CM to send the data". Therefore, when the grant arrives the data must be ready for transmission. To prepare data ready for transmission time is needed for both data collection (sampling of the voice) and processing of the collected data (e.g., providing voice compression). To minimize delay the data for transmission should be ready to transmit just before the grant arrives. Delay occurs if the data collection and processing of the collected data finishes too early and the system has to wait for the grant to arrive. Such a delay can be particularly troublesome for Voice over IP processing which has certain maximum delay specification requirements. Therefore, it is advantageous for the system to know how much time is necessary to collect the data, to know how much time is necessary to process the data, and thereby be able to synchronize such data collection and processing with the grant.

The downstream CM negotiates a grant period with the CMTS as has been hereinabove described. An Unsolicited Grant interval is set by the CMTS, e.g., at 10 ms intervals. Once the grant is established based upon a request (e.g., a signal being sent by a caller telephone that a telephone call is desired to be made on an open telephone channel to a call recipient, such as a used connected to the PSTN), the Unsolicited Grant will be provided, namely, the grant will come at regular intervals. The Unsolicited Grant mode is utilized because the voice transmission is continual during the telephone call and is being collected continuously during every grant interval (e.g., every 10 ms) The grant intervals can be considered to be "Windows" to transmit the sampled packets of data being collected. However, if the data collection and processing is not synchronized it will not be ready at regular intervals, creating both transmission delay and, in turn, end point (i.e., the call recipient) reception delay.

Figure 20:
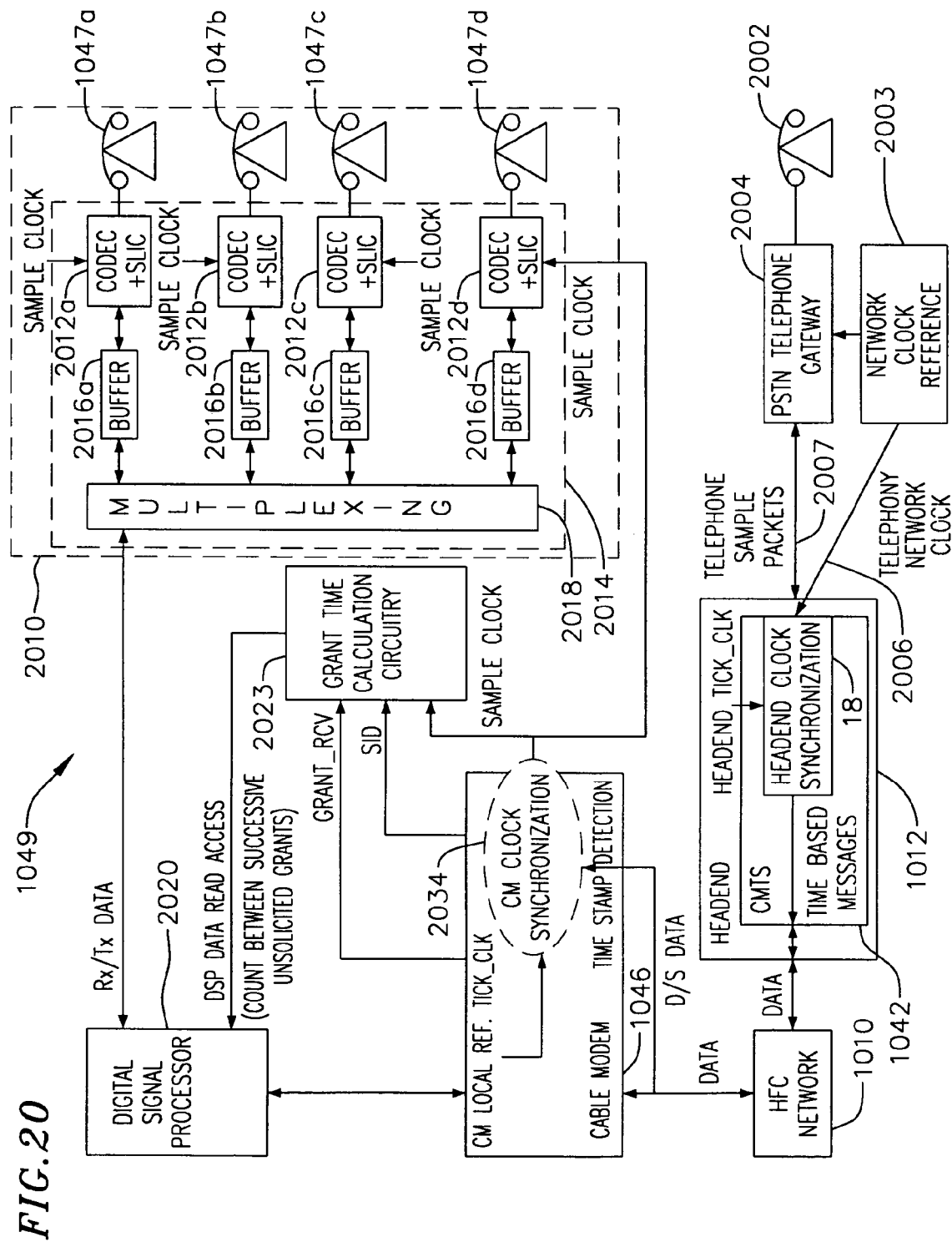
FIG. 20 shows in simplified block diagram form a representative embodiment of the present invention.

Referring to FIG. 20, there is depicted a representative embodiment of an implementation of the present invention wherein a local caller can place a call, over a CM/CMTS system, to a call recipient 2002 connected to the PSTN through PSTN gateway 2004. In the representative embodiment, four caller telephones 1047a, 1047b, 1047c, 1047d for part of an analog to digital signal processing system 2010, which is well known to those skilled in the art. Each caller telephone is connected to respective standard code/decode (CODEC) and subscriber loop interface circuits (SLIC), 2012a, 2012b, 2012c, 2012d, which are part of a transmit analog-to-digital (A/D) and receive digital-to analog (D/A) converter sub-system 2014, which also includes respective buffers 2016a, 2016b, 2016c and 2016d for storing the digital sampled data, and multiplexer/demultiplexer 2018. Converter sub-system 2014 interfaces with a Digital Signal Processor (DSP) 2020, such as LSI Logic Corporation model ZSP16402. DSP 2020 controls signal compression. For example, for transmission, when a caller (e.g., caller 1047a) picks up a telephone receiver and talks, in practice the voice is sampled the converted from analog to digital signals. The DSP controls the compression of the data, which is packetized and transmitted under the control of CM 1046 from CM 1046 to CMTS 1042 as hereinabove described. Similarly, for reception, an incoming digital signal gets received and depacketized under the control of CM 1046 and decompressed under the control of the DSP. The resulting digital signals then get converted to analog signals for listening to by the caller.

When a telephone call is to be made through the CM, the telephone being picked up causes a message to be sent to the CMTS requesting an unsolicited grant, e.g., a periodic grant at a 10 ms grant period. Voice data is then collected and processed during every 10 ms interval between grants. The processing involves the DSP taking the digital signal from the converter sub-system and compressing the digital data (e.g., via an ITU standard G.729 algorithm coder) to enable the use of less bandwidth to transmit. The A/D conversion of a sequence of samples and their buffer storage can be considered the "data collection" aspect. The processing of the collected data has a time established by the compression algorithm chosen. Table 1 below depicts DSP processing time given a 10 ms data collection frame size for various ITU compression algorithms using a typical DSP e.g., LSI Logic Corporation model ZSP16402 140 MHz DSP.

TABLE 1

| Compression | DSP Processing Time |
| --- | --- |
| (a) G.711 | 2 MIPS = 1.4% DSP load = 0.0282 ms to process 2.0 ms of data |
| (b) G.722 | 16 MIPS = 11.4% DSP load = 0.228 ms to process 2.0 ms of data |
| (c) G.726 | 16 MIPS = 11.4% DSP load = 0.228 ms to process 2.0 ms of data |
| (d) G.728 | 35 MIPS = 25% DSP load = 0.5 ms to process 2.0 ms of data |

TABLE 1-continued

| Compression | DSP Processing Time |
| --- | --- |
| (e) G.729 | 20 MIPS = 14.29% DSP load = 1.1 ms to process 2.0 ms of data |

Therefore, for G.711 compression, for example, 2.0 ms of data collection time plus 0.0282 ms of data processing time, i.e., 2.0282 ms, is needed to make the collected and processed data ready just prior to the grant arrival. As such, the data collection must be started at 2.0282 ms before the grant arrives and data collection must be finished prior to 0.0282 ms before the grant arrives. In other words, given the grant arrival schedule and the DSP processing time required based upon the compression chosen, clock synchronization between the grant arrival schedule and the data collection deadline is established. To ensure that the data collection deadline is met a clock for the A/D conversion is derived based upon the clocks of the CMTS and CM system and a pointer is provided to indicate a cutoff portion of the buffer in which the sampled data is being collected.

In accordance with the present invention data to be collected (sampling) is based upon the CMTS clock sent from the CMTS synchronizing the CMs. Grant time calculation circuitry 2022 interfaces between DSP 2020 and CM 1046. Collected data is taken from the respective buffer to include data stored in the buffer which was accumulated for a period before grant arrival, namely the processing time plus the data collection time. The CODEC/SLIC has clock to collect the data. The voice sampling is thereby clocked based upon a sample clock signal from the CM. As such, the most recent data stored in the buffer just before the grant arrival is used for transmission pursuant to the grant. The details of the sample clocking are set forth below.

Briefly referring back to FIG. 20, call recipient 2002 is connected to the PSTN over well-known PSTN telephone gateway 2004. PSTN telephone gateway 2004 is clocked by a telephony network clock signal 2006 from network clock reference 2003 which is also coupled to CMTS 1042 such that PSTN telephone gateway 2004 can be synchronized with the CMTS clock for the transfer of telephone sample packets 2007 between CMTS 1042 and PSTN telephone gateway 2004. The telephony network clock is the well known Building Integrated Timing Supply (BITS) clock. The equipment requirements for interfacing to this clock are known to those skilled in art and are described in Bellcore document TR-NWT-001244. The concept for intraoffice synchronization is also known to those skilled in the art and is described in Bellcore document TA-NWT-000436. The CMTS clock is synchronized with the telephony network clock signal 2006 via headend clock synchronization which utilizes headend reference tick clock 15, as described above with respect to FIG. 11.

Figure 21:
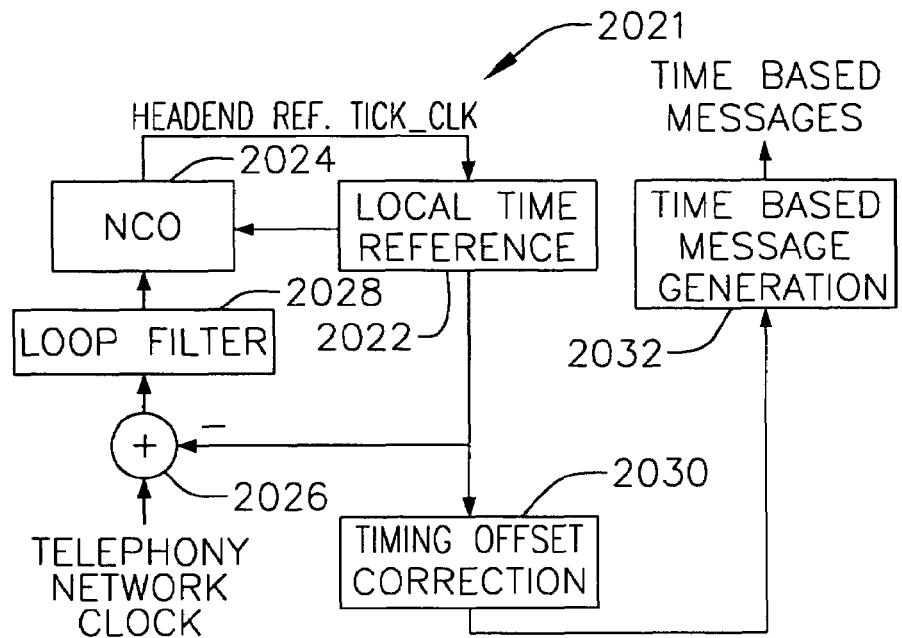
FIG. 21 shows in simplified block diagram form the operation of a headend clock synchronization circuit in, accordance with the present invention.

Referring now to FIG. 21, the operation of headend clock synchronization circuit 18 is further described in conjunction with the telephony network clock. Digital tracking loop 2021 is a substantially stable clock output for the CMTS 1042. A difference between an absolute time reference and the output of a local time reference 2022, which is derived from the numerically controlled oscillator 2024, is formed by differencing circuit 2026. This difference defines a frequency error value which represents the difference between the clock of the CMTS 1042 (which is provided by local time reference 2022) and the clock of the PSTN Telephone Gateway 2004 (which is provided by telephony network clock signal 2006). This frequency error value is filtered by loop averaging filter 2028 which prevents undesirable deviations in the frequency error value from affecting the numerically controlled oscillator 2024 in a manner which would decrease the stability thereof or cause the numerically controlled oscillator 2024 to operate at other than the desired frequency. The loop filter 2028 is configured so as to facilitate the rapid acquisition of the frequency error value, despite the frequency error value being large, and then to reject comparatively large frequency error values as the digital tracking loop 2021 converges, i.e., as the output of the local timing reference 2022 becomes nearly equal to the absolute time reference, thereby causing the frequency error value to approach zero. Timing offset correction 2030 is a simple adder coupled to local time reference 2022 to time based message generator 2032 which provides time based messages as output. The CMTS clock is now synchronized with the PSTN Gateway clock.

Referring again briefly back to FIG. 20, it is noted that grant time calculation circuitry 2023 and CODEC+SLICs 2012a, 2012b, 2012c, 2012d are responsive to a sample clock signal from CM clock synchronization circuitry 2034 of CM 1046. Such sample clock signal provides the clocking synchronization for the voice sampling at 8 KHZ derived from 4.096 MHz CM clock (which is synchronized with the CMTS clock, which is, in turn, synchronized with the PSTN clock.

Figure 22:
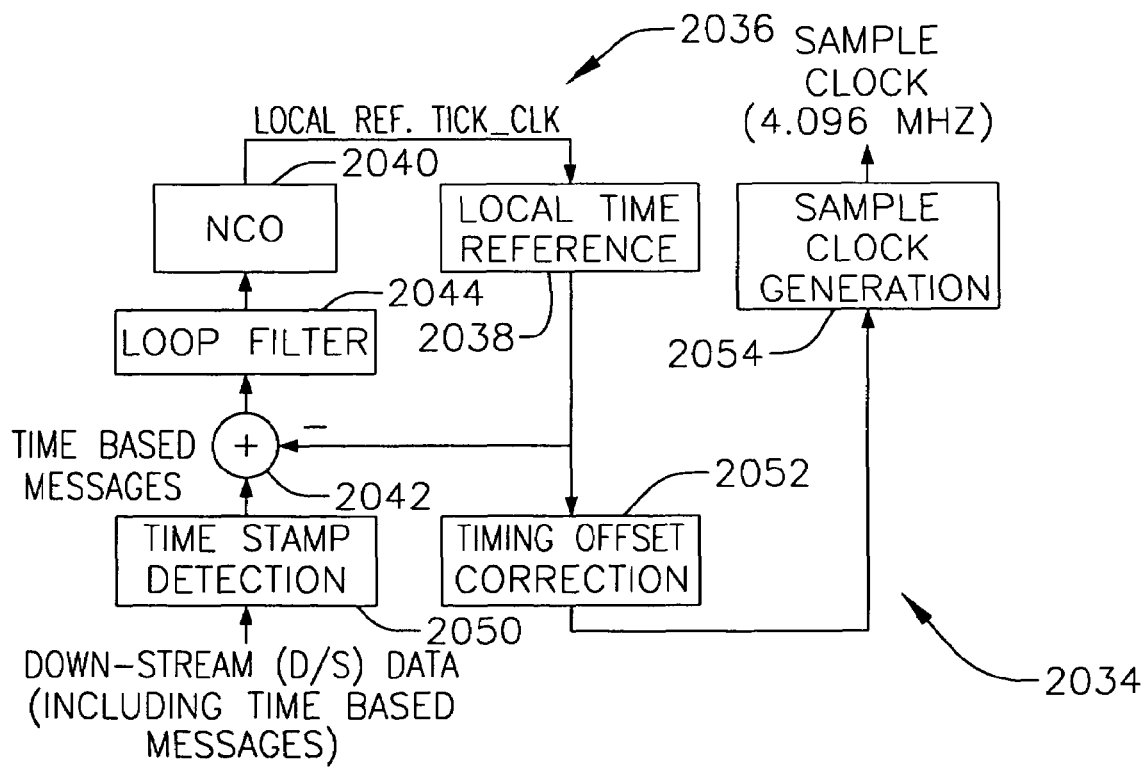
FIG. 22 shows in simplified block diagram form the operation of a cable modem clock synchronization in accordance with the present invention.

Referring now to FIG. 22, the operation of CM clock synchronization circuit 2034 is described. The operation of CM clock synchronization circuit 2034 is similar to that of headend clock synchronization circuitry 2008. Time stamp detector 2050 detects downstream data including the timebase messages generated by timebase message generator 2032 of the CMTS 1042. Timebase message detector 2050 provides an absolute time reference which is representative of the frequency of the crystal oscillator timing reference 16 of the CMTS 1042. Digital tracking loop 2036 is included to provide a substantially stable clock output. A difference between an absolute time reference and the output of a local time reference 2038, which is derived from the numerically controlled oscillator 2040, is formed by differencing circuit 2042. This difference defines a frequency error value. This frequency error value is filtered by loop averaging filter 2044 which prevents undesirable deviations in the frequency error value from affecting the numerically controlled oscillator 2040 in a manner which would decrease the stability thereof or cause the numerically controlled oscillator 2040 to operate at other than the desired frequency. The loop filter 2044 is configured so as to facilitate the rapid acquisition of the frequency error value, despite the frequency error value being large, and then to reject comparatively large frequency error values as the digital tracking loop 2036 converges, i.e., as the output of the local timing reference 2038 becomes nearly equal to the absolute time reference, thereby causing the frequency error value to approach zero. Timing offset correction 2052 is a simple adder coupled to local time reference 2038 to feed sample clock generator 2054 which provides a 4.096 MHZ SAMPLE CLOCK for use by grant time calculation circuitry 2023 and CODEC+SLICs 2012a, 2012b, 2012c, 2012d.

Figure 23A:
FIGS. 23*a*, 23*b* and 23*c* show in graphical form the inter-relationship of signals used in accordance with the present invention.
Figure 23B:
Figure 23C:
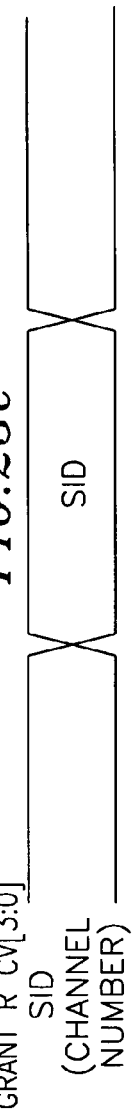

Referring now to FIGS. 23a, 23b and 23c there is respectively depicted the 4.096 MHz sample clock generated, a GrantRcv[4] (i.e., a grant present indication) and a GrantRcv [3:0] SID (i.e., a channelnumber on which the grant is present.

Figure 24A:
FIGS. 24*a*, 24*b* and 24*c* show in graphical for the inter-relationship of further signals used in accordance with the present invention.
Figure 24B:
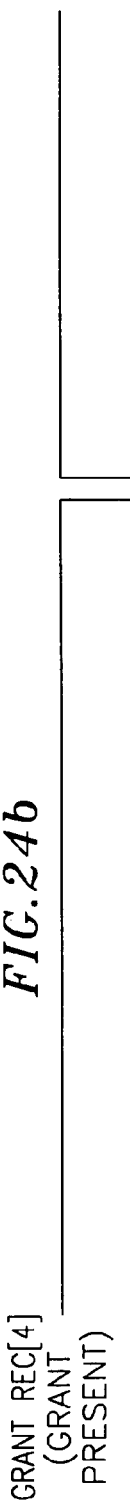
Figure 24C:
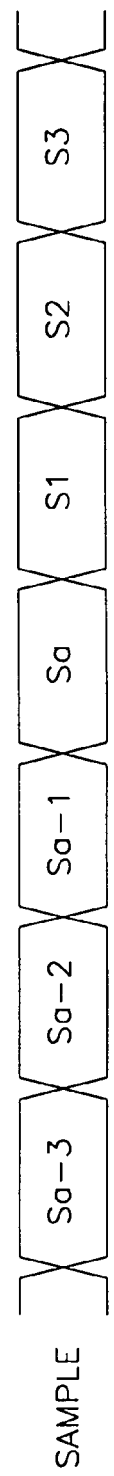

Referring now to FIGS. 24a, 24b, and 24c there is respectively depicted the derived 8 KHz sample clock for voice sampling, the grant Rcv [4] (in a scaled down depiction) and the sampled data.

Figure 25:
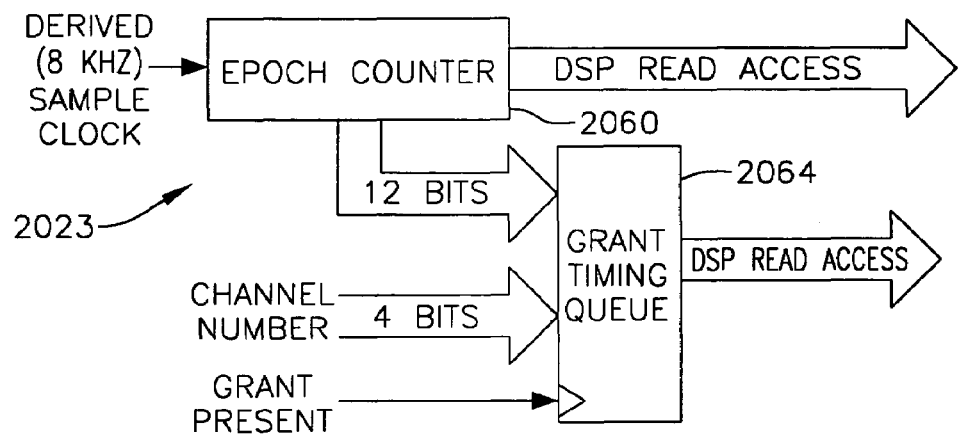
FIGS. 25, 26 and 27 show in simplified block diagram and graphical form grant time calculation circuitry in accordance with the present invention.
Figure 26:
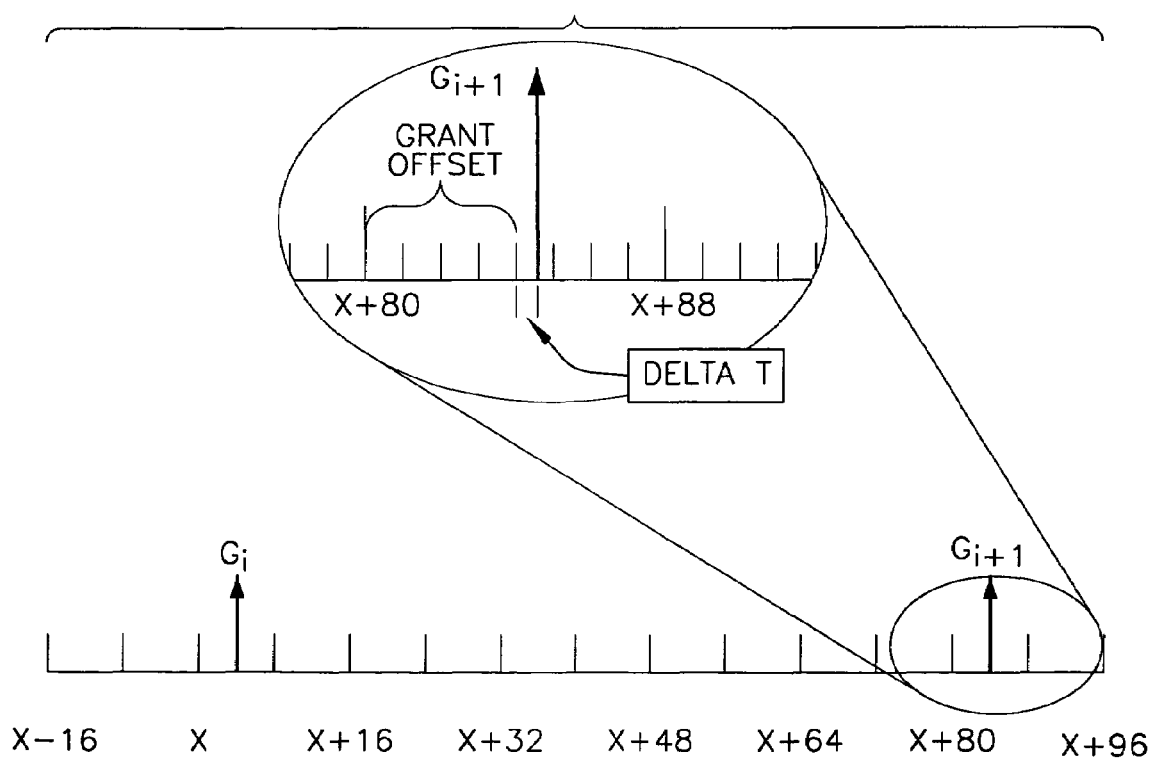
Figure 27:
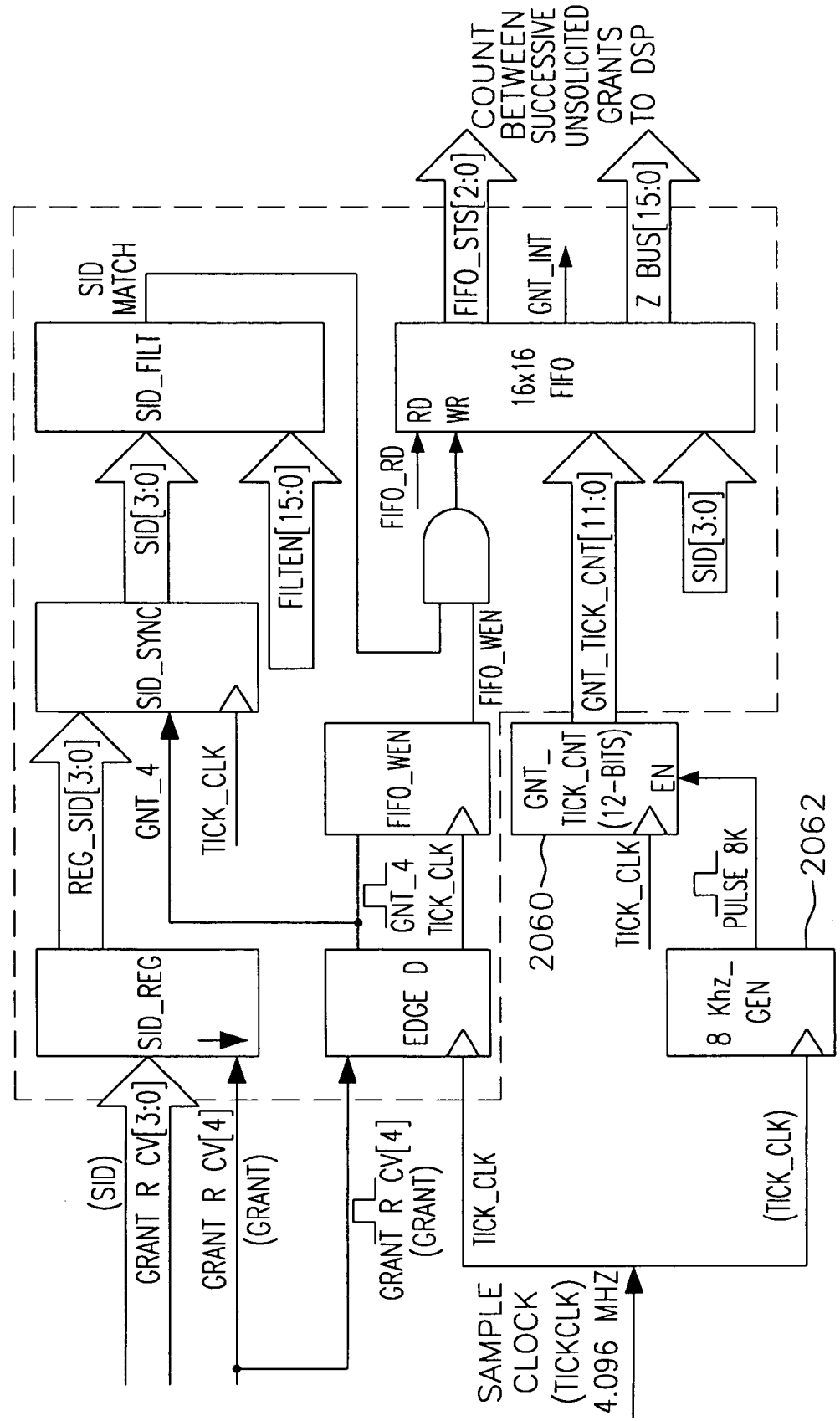

Referring to FIGS. 25, 26 and 27, grant time calculation circuitry 2023 is shown in more detail. Epoch counter 2060 is pulsed by an 8 KHz pulse generated by pulse generator 2062 derived from the 4.096 MHz sample clock produced by CM clock synchronization circuitry 2034 in CM 1046. Grant timing queue 2064 is responsive to the 4 bit SID channel number and grant present signal as shown in FIGS. 23a, 23b and 23c. The grant time calculation circuitry interfaces to DSP 2020 and counts between successive Unsolicited Grants. The epoch counter is a 12 bit counter and is advanced by the 4.096 MHz sample clock with 8 khz enable pulse. The grant arrival timing queue is latched by the grant present signal from the CM 1046. This signal is present whenever a grant of interest is present on the upstream. The grant timing queue accepts a 16 bit input, 4 bit of which are the hardware queue number associated with the grant present signal and 12 bit are the Epoch counter value. The DSP can read the current epoch counter value. The result of grant time calculation by grant time calculation circuitry 2023 is the production of a historical map of when grants arrive with respect to the epoch counter value as shown in FIG. 26. Referring more particularly to FIG. 27, grant timing queue 2064 includes logic block SID_REG, SID_SYNC and SID_FILT for capturing SID information. A 16×16 FIFO stores the tick count for each respective grant and its corresponding SID. Each entry in the FIFO contains the SID and gnt_tick_cnt corresponding to the grant arrival. This information allows DSP software to build a table of SIDs and gnt_tick_cnts which allows calculation of an average inter-arrival time for each grant. This information allows the software to then schedule the data processing as shown and described in more detail below with respect to FIG. 29a to ensure having packets ready in time for the grants.

Figure 28:
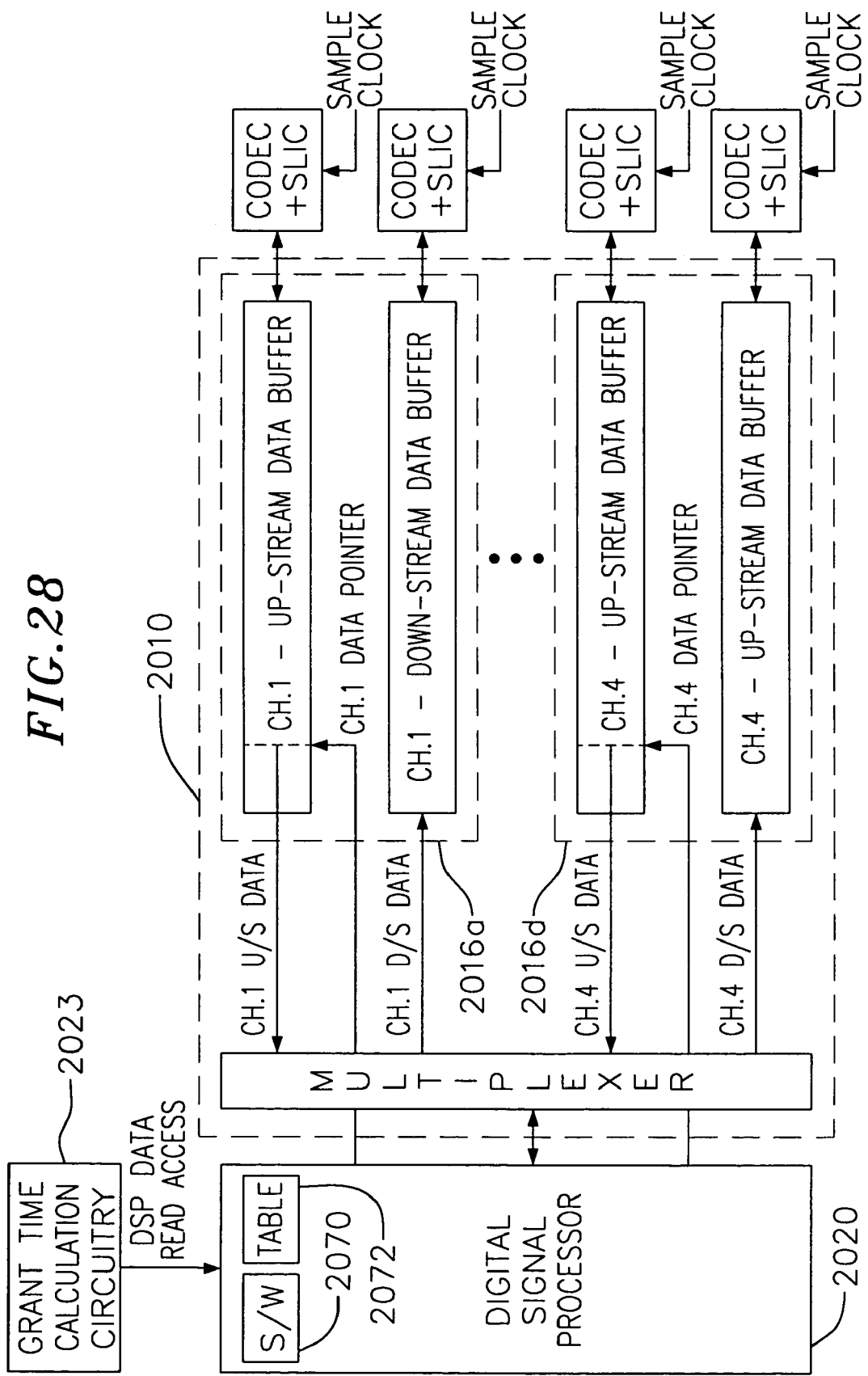
FIG. 28 shows in simplified block diagram form the inter-relationship between grant time circuitry, digital signal processor and buffers in accordance with the present invention.

Referring to FIG. 28, the inter-relationship between grant time calculation circuitry 2023, DSP 2020 and buffers 2016a, . . . 2016d are shown in more detail. As indicated above, grant time calculation circuitry 2023 provides DSP Data Read Access information (SID and gnt_tick_cnts) to DSP 2020. This DSP Data Read Access information provides the timing information to the DSP so that it will know when and where to read the upstream data from the upstream data buffer. It also provides timing information as to when to place the downstream uncompressed voice data into the down stream data buffer. This timing information allows software 2070 for DSP 2020 to build a table 2072 of SIDs and grant tick counts, calculate an average inter-arrival time for each grant, schedules the data processing, and controls data transfers into and out of the data buffers.

As seen in FIG. 28, representative buffer 2016a (e.g., SID/Channel 1) and buffer 2016d (e.g., SID/channel 4) include both an upstream data buffer and a downstream data buffer, each having its respective CODEC/SLIC and clocked by the Sample Clock as described hereinabove. When sampled voice packet data is to be sent along Channel 1, in response to a grant, a Channel 1 data pointer under the control of DSP 2020 utilizes the grant time calculation information from grant time calculation circuitry 2023 to identify from where in the upstream data buffer the most current sampled data is to be taken and transmitted to CM 1046, the not-as-current samples beyond the pointer (i.e., stored earlier in the buffer for Channel 1) is discarded. Similarly, when sampled-voice packet data is to be sent along Channel 4, in response to a grant, a Channel 4 data pointer under the control of DSP 2020 utilizes the grant time calculation information from grant time calculation circuitry 2023 to identify from where in the upstream data buffer the most current sampled data is to be taken and transmitted to CM 1046, the not-as-current samples beyond the pointer (i.e., stored earlier in the buffer for Channel 4) is discarded. The selected sampled voice packet data is then transmitted to CM 1046 by DSP 2020 for transmission to CMTS 1042 as hereinabove described.

Figure 29A:
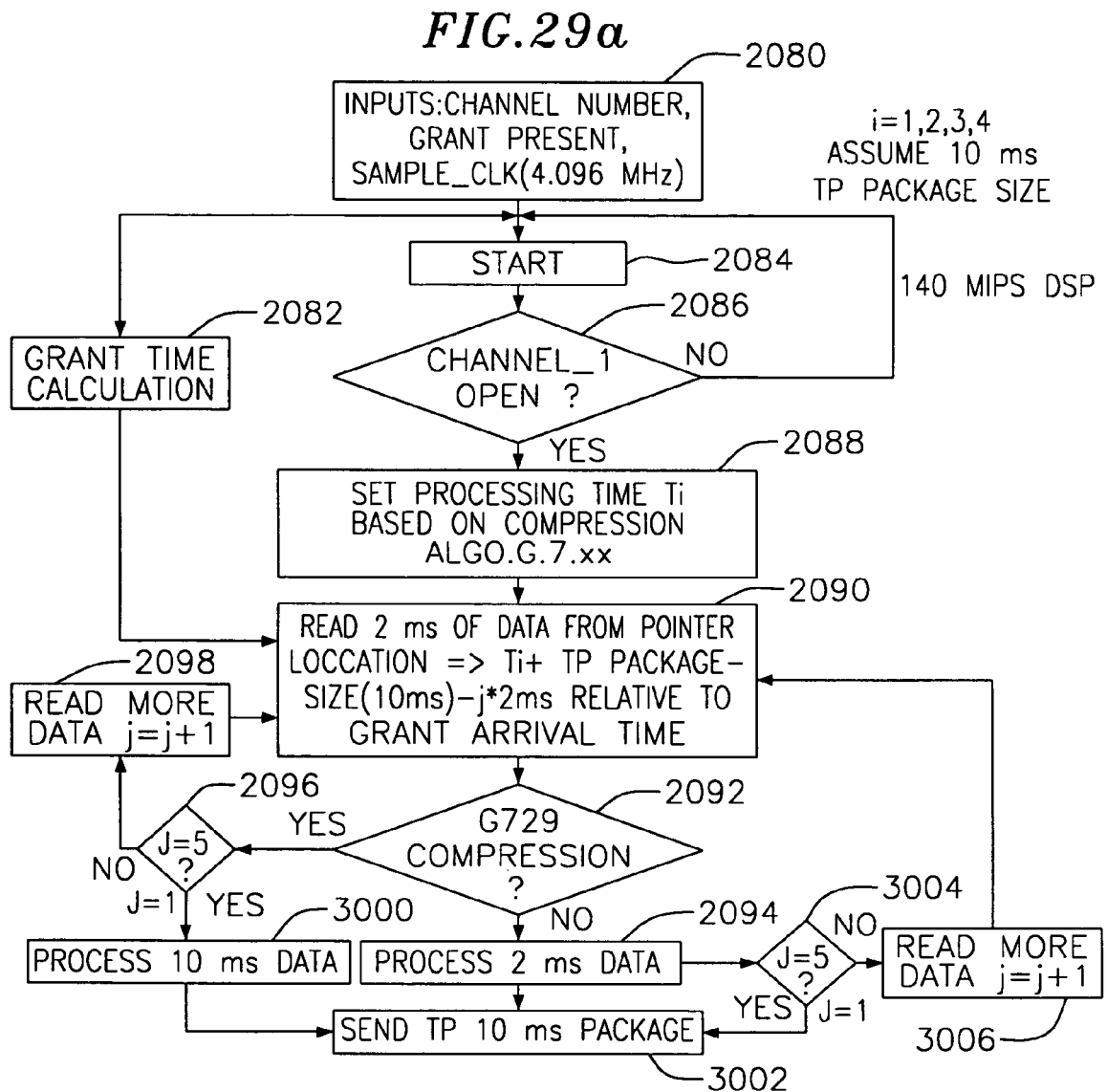
FIGS. 29*a* and 29*b* shows in flow diagram form an operational DSP system software decision implementation in accordance with the present invention.
Figure 29B:
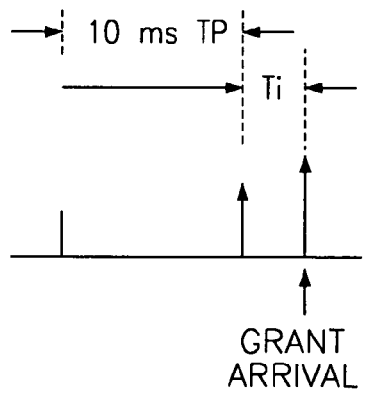

Referring to FIGS. 29*a* and 29*b* an operational flow chart is provided showing DSP system software decision implementation in accordance with the present invention.

Consider a system where DSP 2020 is a 140 MIPS digital signal processor, such as LSI Logic Corporation model ZSP16402, the transport package (TP) package size is 10 ms, i.e., the voice package size in milliseconds within each grant interval that is being transmitted to/from the telephone, and the data processing involves voice compression selected from Table 1 set forth above where the data processing time needed before grant is 2 ms for those compression-algorithms other than G.729 wherein the time needed is 10 ms. In other words, referring back to Table 1, for each 2.0 ms, the DSP must encode and decode 4 channels of data while the 10 ms is used for the signaling of a TP package transmission. The far-end voice and the near end voice are synchronized via the sample clock. It should be noted, for example, that it would take 100% of the DSP load to process 4 channels of G.728 for the 140 MIPS DSP.

Referring back to FIG. 29*a*, at stage 2080, inputs as to Channel Number initiating a request, corresponding grant present and sample clock from cable modem 10 are provided for grant time calculation 2082 and channel assessment start 2084 by the DSP software. A particular channel open, i.e., channel i=1, 2, 3, or 4, is determined at stage 2086. If no, the processing begins again, if yes, processing time Ti, as seen in FIG. 29*b*, is set at stage 2088 based upon the compression algorithm chosen. At stage 2090, upon the grant time calculation receipt by the DSP, 2 ms of data from the pointer location in the corresponding buffer associated with the open channel is read. For those algorithms with 2 ms processing time, five processing cycles, having a j index going from 1 to 5, is needed. For the G.729 algorithm a 2 ms processing time cannot be used since the uncompressed voice data is only available at 10 ms frame-size. As such, at stage 2092 a determination as to G.729 is made, and if the determination is no 2 ms of data is processed at stage 2094. If there is G.729 compression, the cycle index j is determined at stage 2096, and if, no more data is read incrementally j=j+1 at stage 2098. Once j=5 at stage 2096, 10 ms of data is processed at stage 3000 and the 10 ms package is then transmitted at stage 3002 pursuant to the current grant arrival. Similarly to the j indexing for data read, a j indexing is performed for data processing at stages 3004 and 3006. Once the processing index j=5 at stage 3004, where the 5 2 ms iterations have been completed, the 10 ms package is sent at stage 3002.

Those skilled in the art will appreciate that alternative embodiments to that which has been described herein can be implemented. For example, while the present invention has been described in conjunction with a cable modem/cable modem termination system, the present invention can be used with any transmission system that allocates bandwidth periodically instead of on demand, such as with the well known Asynchronous Transfer Mode (ATM) protocol system. Further, interrupts could be generated by the hardware to indicate that upstream transmission is complete. This signal would identify the time when the upstream transmission means has sent all of the data and the transmission buffer is now available for re-use.

Those skilled in the art can also appreciate that a method for communicating information, as set forth in more detail in Appendix A hereto, can include: allocating a time slot in a time division multiple access system for a transmission from a subscriber to a headend the time slot being sufficient for only a first portion of a transmission, a second portion of the transmission being transmitted in other than the first time slot; enhancing synchronization a clock of the subscriber with respect to a clock of the headend using a message transmitted from the headend to the subscriber which is indicative of an error in a subscriber transmission time with respect to the time slot; using a feedback loop process to determine at least one of fractional symbol timing correction and carrier phase correction of a transmission from the subscriber to the headend; monitoring quality of at least one channel and changing modulation in response changes to monitored channel quality; using information representative of parameters of received time division multiple access data to facilitate processing of the received time division multiple access data in a receiver, the parameters being communicated within the headend; and generating filter coefficients at the headend from a ranging signal transmitted from the subscriber to the headend and transmitting the filter coefficients from the headend to the subscriber, the filter coefficients being used of the subscriber to compensate for noise in a transmission from the subscriber to the headend.

Those skilled in the art can also appreciate that such information communication methodology as set forth in the Appendix enclosed herewith, or portions thereof, can be combined with the further methodology described hereinabove with regard to the processing of sampled packets, namely, the processing of sampled packets from a packet sender for transmission over a transmission system having a periodically allocated bandwidth to a packet recipient by: determining unsolicited grant arrivals in response to a request from the packet sender; synchronizing the storing of sampled packets with the unsolicited grant arrivals; and transmitting, upon receipt of an unsolicited grant arrival, currently stored sampled packets for further transmission to the packet recipient over the transmission system having a periodically allocated bandwidth. Such a combined system can provided an enhanced information communication methodology.

The invention claimed is:

1. A sample and packet synchronization subsystem interfaced between a cable modem system and a plurality of bit-rate sampled data transmission devices, the sample and packet synchronization subsystem comprising:
  a transmit analog-to-digital/receive digital-to-analog converter sub-system, including respective buffers for storing digital sampled data, the respective buffers being coupled between a multiplexer/demultiplexer and respective standard code/decode and subscriber loop interface circuits, each standard code/decode and subscriber loop interface circuit being coupled to a respective bit-rate sampled data transmission device; and
  a digital signal processing subsystem, interfaced between the cable modem system and the transmit analog-to-digital/receive digital-to-analog converter sub-system, for transmission and reception through the cable modem system to and from a packet recipient, the digital signal processing subsystem:
    determining unsolicited cable modem system grant arrivals in response to a request from the bit-rate sample data transmission device;

synchronizing the storing of sampled packets with the unsolicited cable modem system grant arrivals; and transmitting to the cable modem system upon receipt of an unsolicited cable modem system grant arrival, currently stored sampled packets for further transmission to the packet recipient over the cable modem system.

2. The sample and packet synchronization subsystem of claim 1, wherein the digital signal processing subsystem:

for transmission: compresses, packetizes and transmits compressed signals to the cable modem system, and for reception: receives incoming digital signals from the cable modem system, depacketizes and decompresses the digital signals and provides decompressed digital signals to the transmit analog-to-digital and receive digital-to-analog converter sub-system.

3. The sample and packet synchronization subsystem of claim 1, wherein the digital signal processing subsystem further comprises grant time calculation circuitry coupled between the transmit analog-to-digital/receive digital-to-analog converter sub-system and the cable modem system, the grant time calculation circuitry deriving a clock for standard code/decode and subscriber loop interface circuits based upon clocks of the cable modem system and providing a pointer to indicate a cutoff portion of buffers in which sampled data is being collected to ensure that data collection deadlines are met.

4. The sample and packet synchronization subsystem of claim 2, wherein the bit-rate sampled data transmission devices comprises voice packet senders and sampled voice packets from voice packet senders are voice compressed.

5. The sample and packet synchronization subsystem of claim 1, wherein the packet recipient comprises a Public Switched Telephone Network.

* * * * *

UNITED STATES PATENT AND TRADEMARK OFFICE
CERTIFICATE OF CORRECTION

PATENT NO. : 7,190,704 B2  Page 1 of 1
APPLICATION NO. : 10/780362
DATED : March 13, 2007
INVENTOR(S) : Rabenko et al.

It is certified that error appears in the above-identified patent and that said Letters Patent is hereby corrected as shown below:

Title Page
Item [75], Inventors section please replace "Henry Sameuli, San Juan Capistrane, CA (US)" with --Henry Samueli, Corona Del Mar, CA (US)--.

Signed and Sealed this

Fifth Day of June, 2007

JON W. DUDAS
*Director of the United States Patent and Trademark Office*